(12) United States Patent
Kathwari et al.

(10) Patent No.: US 8,190,506 B2
(45) Date of Patent: *May 29, 2012

(54) SOLUTIONS SERVER

(75) Inventors: Omar Kathwari, New York, NY (US);
Michael Bundy, Katy, TX (US);
Vladimir Goldfeld, New York, NY (US); Randy Prager, New York, NY (US)

(73) Assignee: **E*Trade Financial Corporation**, New York, NY (US)

( * ) Notice: Subject to any disclaimer, the term of this patent is extended or adjusted under 35 U.S.C. 154(b) by 715 days.

This patent is subject to a terminal disclaimer.

(21) Appl. No.: 12/347,587

(22) Filed: Dec. 31, 2008

(65) Prior Publication Data

US 2009/0112776 A1   Apr. 30, 2009

Related U.S. Application Data

(60) Continuation of application No. 10/939,617, filed on Sep. 13, 2004, now Pat. No. 7,490,061, which is a division of application No. 09/578,947, filed on May 25, 2000, now abandoned.

(51) Int. Cl.
*G06Q 40/00*   (2006.01)

(52) U.S. Cl. .................................................... 705/37
(58) Field of Classification Search .................. None
See application file for complete search history.

(56) References Cited

U.S. PATENT DOCUMENTS 6,963,855 B1 * 11/2005 Borzenko ........................ 705/37
7,035,819 B1 *  4/2006 Gianakouros et al. .......... 705/37

* cited by examiner

*Primary Examiner* — Olabode Akintola
(74) *Attorney, Agent, or Firm* — Conley Rose, P.C.

(57) ABSTRACT

Method and system for providing solutions to problems including generating problem definitions for problems, receiving environmental information required for generating solutions for the problems, generating solutions for the problems dependent upon the environmental information and the problem definitions, and communicating solutions to clients before the solutions are disclosed. A solution server comprising a processor coupled to at least one source of environmental information and coupled to at least one client, the processor programmed to generate problem definitions for problems, receive environmental information required for generating solutions for the problems, generate solutions for the problems dependent upon the environmental information and the problem definitions, and communicate solutions to clients before the solutions are disclosed.

39 Claims, 27 Drawing Sheets

Generate Solutions

Database

*Optional Elements

Subscription Entry

Solution Generation

Create Solutions

Solution Retrieval and Transmission

SOLUTIONS SERVER

CROSS-REFERENCE TO RELATED APPLICATIONS

This application is a continuation of copending application Ser. No. 10/939,617 titled "Solutions Server" filed Sep. 13, 2004, which is incorporated herein by reference.

BACKGROUND

There exists a class of problems whose solutions depend partly on external independent environmental variables and partly on variables whose values in solutions are determined by the persons who need the problems solved. It is an additional characteristic of problems of this class that both the problems and their solutions are capable of complete definition by use of machine readable, machine manipulable data elements.

One illustrative example is purchasing problems in which existence of a solution to a particular problem depends partly upon external independent variables such as availability of goods, types of goods available, and prices of goods available. In the purchasing example, some variables are set by purchasers, the person interested in solving the purchasing problems, such variables including, for example, the characteristics of goods sought, timing of purchases, quantities sought, and so on. For such problems, a complete solution can be specified by source, price, and description of goods.

If for example, a customer wished to purchase one automobile of a particular year, manufacture, model, color, and maximum price, these facts can be recorded and defined to represent a purchasing problem. If sources, automobile dealerships, can be identified where cars with those characteristics can be purchased, these facts can be recorded and defined to represent solutions to the purchasing problem. If, before a customer presents an actual purchasing problem, such problems are defined, and if good and current solutions for the problems are sought out and recorded, then, if the customer's purchasing problem matches one of the recorded predefined solutions, from the customer's point of view, the customer's purchasing problem can be matched with good solutions extremely quickly.

Another illustrative example is purchasing securities. It is typical in securities purchasing for a customer or client to identify by symbol the particular securities sought for purchase and the quantity sought. Optionally clients can specify price, market, and other values. External independent variables not in the client's control include, for example, actually available quantities and prices. If a customer order is viewed as presenting a purchasing problem, i.e., where to purchase a certain quantity of a certain security, then a complete solution to the problem can be defined as identifying one or more markets from which can currently be acquired, in a single purchase or in several smaller purchases, a quantity of the securities specified in the customer order.

In prior art, when an order for securities is received from a client, a securities broker-dealer must laboriously, case-by-case, check present market information to determine whether there are available sources to solve the purchasing problem or problems posed in the client order. Even when the process is automated, it is still labor intensive. Many broker-dealers still aggregate orders. In broker-dealer systems capable of single order processing, however, this process in prior art typically is carried out for each order individually. This procedure in prior art is computationally demanding for each order, and dealers receive many, many orders. There is a need for a way of generating solutions to securities purchasing problems posed by purchase orders before the problems are posed, before the orders are received. Such a way of generating solutions would be useful not only for purchasing securities, but also for many different kinds of activities that present problems capable of precise advance definition and advance generation of well defined solutions.

In the field of securities trading, a common problem of prior art is identifying natural buyers and seller, referred to collectively as "natural traders." "Natural Trader" indicates a source of securities trades, either sales or purchases, in which available quantity is larger than quoted quantity, that is, there exists "hidden liquidity." Natural traders exist because sources of large volumes of securities trading liquidity, such as institutions, cannot quote their entire available quantity without artificially distorting prices due to extreme, actual or perceived, fluctuations in supply or demand. Natural traders are identified by a tendency to continuously requote after trading or by their tendency to fill orders with quantities larger than the quantities displayed in their quotes. It is advantageous for traders seeking to increase or decrease substantial positions to be able to identify reliable sources of liquidity, even if the sources are not displaying the actual levels of liquidity available through them. In prior art, however, identifying reliable sources of undisplayed liquidity has been a hit or miss activity conducted manually by traders using human reaction time. What is needed is an automated method of identifying, and trading based upon the identification, of natural traders.

An additional difficulty in prior art in the field of securities trading is that market quotes upon which trading and investment decisions are based, more or less by definition, embody no indication of hidden liquidity. Prior art leaves traders and investors upon their own resources, using human perception and response times in observation of quotes and trade data, to detect sources of hidden liquidity. What is needed, both for automated trading and for display to human beings for their use in analysis and decision-making, is a form of quote that includes an indication of hidden liquidity.

SUMMARY

In a first aspect of the present invention, a method is provided for developing solutions to problems. The method includes generating problem definitions for problems, receiving environmental information required for generating solutions for the problems, generating solutions for the problems dependent upon the environmental information and the problem definitions, and communicating solutions to clients before the solutions are needed. In embodiments directed towards securities trading, when customer orders matching predefined problems are received, the speed with which solutions and corresponding orders to markets can be generated represents an improvement over prior art.

A further aspect of the invention provides a system for developing solutions to problems including means for generating problem definitions for problems. The system includes means for receiving environmental information required for generating solutions for the problems, means for generating solutions for the problems dependent upon the environmental information and the problem definitions, and means for communicating solutions to clients before the solutions are needed.

A still further aspect of the invention provides a device, a solutions server comprising a processor coupled to at least one source of environmental information and coupled to at least one client, the processor programmed to generate problem definitions for problems, receive environmental information required for generating solutions for the problems, generate solutions for the problems dependent upon the environmental information and the problem definitions, and communicate solutions to clients before the solutions are needed. This aspect of the invention provides also a memory coupled to the processor, the processor programmed to store in the memory problem definitions and solutions. Alternative embodiments provide the problem definitions encoded in computer programs stored in computer memory with the processor operating under program control to store solutions in memory.

An additional aspect of the invention provides a method of creating solutions for trading securities, including receiving a level-two quote comprising a symbol and at least one market participant quote, the market participant quote further comprising a quote price, a quote quantity, a quote MPID, and a quote side. This aspect of the invention includes creating in computer memory a solution set comprising at least one solution record corresponding to each market participant quote in the level-two quote, the solution record comprising a solution symbol, a solution side, a solution MPID, a solution price, a solution quantity, and a solution latency, the solution latency comprising a latency for the market identified by the solution MPID. Embodiments of this aspect of the invention also send the solution set to at least one client. Clients in such embodiments typically comprise automated systems for trading securities wherein the sent solution set is stored in computer memory within the client system. Client systems typically also use the sent solution records to create orders for securities. Many client systems are scaled. Typical embodiments of this aspect use trade data to calculate hidden quantity ratios which are in turn used to indicate sources of undisplayed or hidden liquidity, utilized in the embodiments in the form of calculated quantities for solutions or solution records.

A still further aspect of the invention is a system for providing solutions for trading securities, including means for receiving a level-two quote, the level-two quote comprising a symbol and at least one market participant quote, the market participant quote further comprising a quote price, a quote quantity, a quote MPID, and a quote side. Embodiments of this aspect of the invention include means for creating in computer memory a solution set comprising at least one solution record corresponding to each market participant quote in the level-two quote, the solution record comprising a solution symbol, a solution side, a solution MPID, a solution price, a solution quantity, and a solution latency, the solution latency comprising a latency for a market identified by the solution MPID. Typical embodiments of this aspect use trade data to calculate hidden quantity ratios which are in turn used to indicate sources of undisplayed or hidden liquidity. In these embodiments, hidden quantity ratios are used to develop calculated quantities for solutions or solution records.

Such embodiments typically include means for sending the solution set to at least one client. Clients include automated systems for trading securities typically comprising means for storing the sent solution set in computer memory in the client, means for creating, from at least one of the sent solution records, an order for securities, wherein creating an order from the sent solution record further comprises creating a used solution record. Clients often comprise more than one automated system for trading securities and such automated systems for trading securities often are scaled.

An additional aspect of the invention is a system for providing solutions for trading securities, the system comprising at least one processor coupled to at least one source of quotes and coupled to at least one client with the processor programmed to receive at least one level-two quote, the level-two quote comprising a symbol and at least one market participant quote, the market participant quote comprising a quote price, a quote quantity, a quote MPID, and a quote side. In embodiments of this aspect of the invention, the processor is also programmed to create a solution set comprising at least one solution record corresponding to each market participant quote, the solution record comprising a solution symbol, a solution side, a solution MPID, a solution price, a solution quantity, and a solution latency, the solution latency comprising a latency for the market identified by the solution MPID. Embodiments of this aspect of the invention include a memory coupled to the processor with the processor programmed to store the solution set in the memory.

Embodiments of this aspect of the invention typically include the processor further programmed to send solution sets to the client. Clients often comprise automated systems for trading securities. Client systems often include at least one client processor coupled to client memory with the client processor programmed to store the sent solution set in client memory, create, dependent upon the sent solution records, orders for securities, and send the orders for securities to markets. In many embodiments of this aspect of the invention, the client comprises more than one automated system for trading securities and the automated systems are scaled. Typical embodiments of this aspect use trade data to calculate hidden quantity ratios which are in turn used to indicate sources of undisplayed or hidden liquidity, utilized in the embodiments in the form of calculated quantities for solutions or solution records.

A still further aspect of the invention provides a method of producing an improved level-two quote for use in securities trading and market analysis. Embodiments of this aspect typically include receiving in an automated system, which system comprises at least one computer processor coupled to computer memory, a level-two quote, the level-two quote comprising a data format further comprising a symbol and at least one market participant quote, the market participant quote further comprising a data format further comprising a quote price, a quote quantity, a quote MPID, and a quote side. Such embodiments typically create in computer memory, dependent upon the level-two quote, an improved level-two quote comprising a symbol and at least one improved market participant quote, which improved market participant quote comprises a side, an MPID, a price, a quantity dependent upon the market participant quote quantity and also dependent upon a hidden quantity ratio, and a latency, the latency comprising a latency for the market identified by the MPID.

Such embodiments typically provide the improved level-two quote to clients. In most embodiments, the improved level-two quote comprises at least two improved market participant quotes and the improved market participant quotes are sorted. Providing improved level-two quotes to clients is typically done in the form of streaming serial data provided through means for data communications. Typical embodiments of this aspect use trade data to calculate hidden quantity ratios which are in turn used to indicate sources of undisplayed or hidden liquidity, utilized in the embodiments in the form of calculated quantities for improved level-two quotes.

DRAWINGS

DETAILED DESCRIPTION OF EXEMPLARY EMBODIMENTS

Definitions

Figure 1:
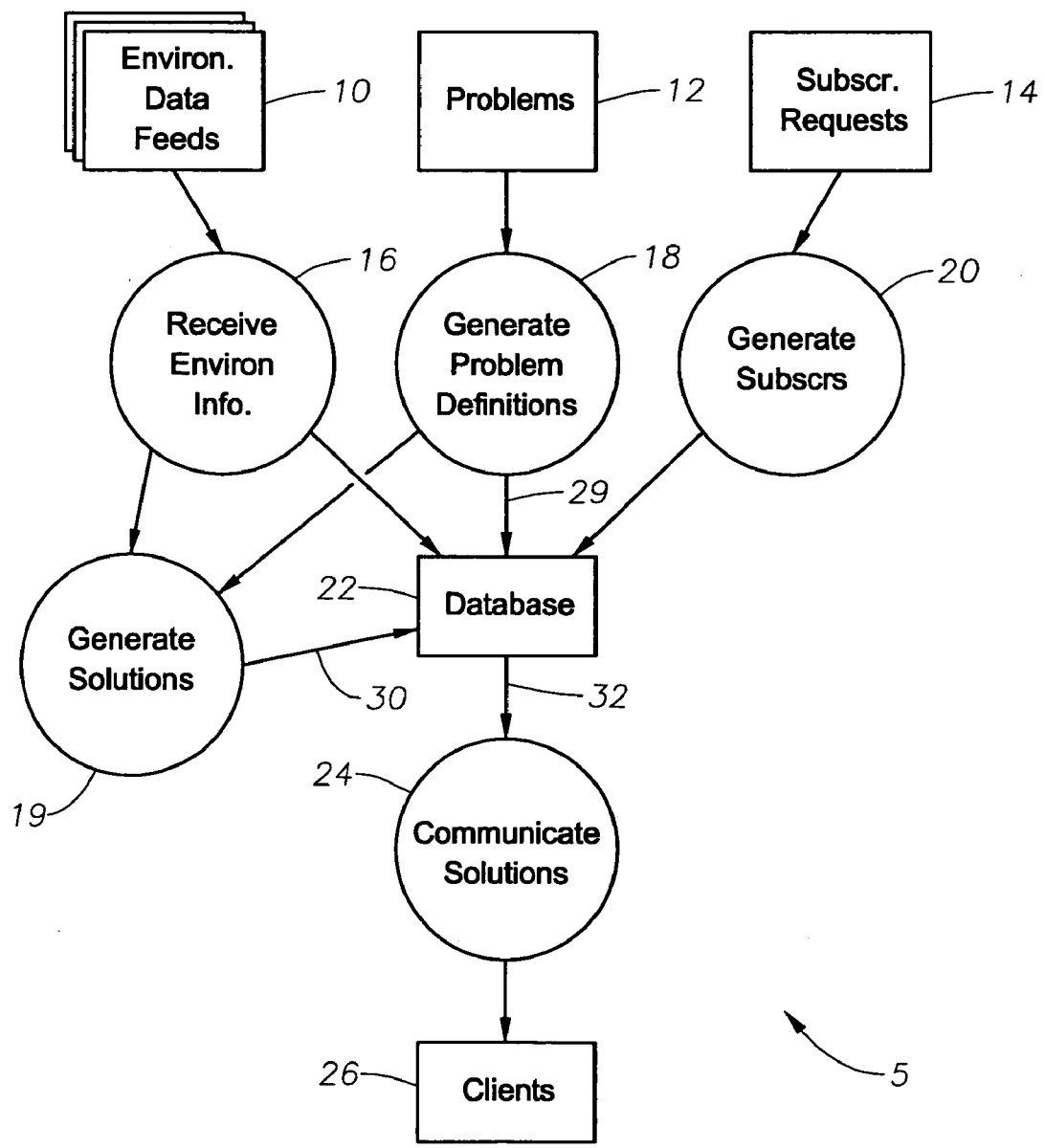
FIG. 1 is a process flow overview for typical exemplary embodiments.

"Cancellation" is termination of an order, or partial termination of an order, by the customer or by software comprising an embodiment of the invention. In addition, markets can cancel orders, or parts of orders, for example, in response to an IOC order.

"Client" refers to any entity capable of utilizing solutions. Clients in some embodiments will be computer systems located remotely from the computer on which a solution server is installed and running. In other embodiments, clients can be persons, individuals or organizations, subscribing to solutions to be delivered by mail or email. In some embodiment, clients through their use of the invention in fact comprise elements of the invention. In embodiments directed to high-performance trading of securities, clients often will be broker-dealer computer systems located remotely from the computer on which a solution server is installed and running; in such systems, solutions are typically delivered from the solution server to the client by use of data communications means such as networks, dedicated communications lines, or satellite channels. In other embodiments directed to high-performance trading of securities, clients will be broker-dealer software systems installed and operating on the same computer system upon which is installed a solution server; in such systems solutions typically are delivered to the client by tightly coupled means such as shared memory segments, subroutine calls, or calls to member functions in an object-oriented class object.

"ECN" abbreviates "Electronic Communications Network," referring to an order matching service that provides liquidity by matching orders rather than by maintaining inventory. In the context of the invention, ECNs are considered markets. ECNs, like market makers, are identified by use of market participant identification codes or "MPIDs." In order to avoid confusion with data communications networks, ECNs are referred to as either "ECNs" or as "markets." Some current ECNs, their symbols and names, are listed below. The number and identities of ECNs changes from time to time.

| Example List of ECNs | |
|---|---|
| MPID | Name |
| ARCA | Archipelago |
| ATTN | Attain |
| BRUT | Brass Securities |
| BTRD | Bloomberg Trade Book |
| INCA | Instinet |
| ISLD | Island |
| MWSE | Midwest Stock Exchange |
| NTRD | NexTrade |
| REDI | Speer Leeds |
| STRK | Strike |
| TNTO | Terranova |

"Environmental" refers to a category of information needed for generating solutions to problems. The invention addresses a class of problems in which part of the information needed for generating solutions is provided by the clients who need the solutions, and part of the information varies independently and is derived from external sources. Information varying independently and derived from external sources is referred to as "environmental." In embodiments addressed to securities trading, for example, environmental information comprises market information, such as market identification codes, securities symbols, quantities, and prices, received in streaming data feeds from NASDAQ, market makers, ECNs, and other market sources. Such sources are sometimes referred to as quotes, level two quotes, market participant quotes, or tickers.

"Exchange" means a national, regional, or international exchange for securities trading including for example, Nasdaq or NYSE.

"Executed," in reference to an order, means that shares have been either bought or sold according to the side of the order.

"Filled" means executed. That is, all shares in the order have been executed, bought or sold according to the side of the order. If an order is subject to partial fulfillment, then the order can be partly filled and partly rejected or cancelled, in which case the order will never be considered filled. Processing of an order can therefore be completed through some combination of cancellation, rejection, killing, and partial execution without the order's ever being filled. Processing of an order is said to be complete when all the shares in the order, share by share, have been executed, cancelled, rejected, or killed.

"Hidden Quantity Ratio" is an indication of a natural trader. Hidden quantity ratio is calculated in some embodiments as a ratio of a recent fill quantity divided by a corresponding quote quantity, the quote quantity being the quantity of securities quoted by the market from whom the securities were ordered and the fill quantity being the quantity of shares actually sold or purchased in response to a corresponding order. Obviously the order quantity must be larger than the quote quantity for the hidden quantity ratio to be larger than 1.0. Hidden quantity ratio is calculated in some embodiments as a running average of ratios of fill quantities to corresponding quote quantities. "Running average" means an average of ratios for fill quantities and quote quantities gathered and calculated over a defined period of time. Hidden quantity ratio is calculated in other embodiments as a decaying average of fill quantities to corresponding quote quantities. "Decaying average" means an average of a particular number of ratios for fill quantities and quote quantities calculated, in some embodiments, by use of a maximum number of recently recorded quantities. Other methods of calculating hidden quantity ratios are used in other embodiments, all within the scope of the invention.

"Inside price" means, as appropriate, the highest bid price or the lowest ask price for a particular security. For buy orders, the inside price is the lowest ask price. For sell orders, the inside price is the highest bid price.

"Latency" means a measure of the speed with which markets respond to orders and cancellations. Latency in many embodiments of the invention is determined as the difference between the time when a response to an order is received and the time when the corresponding order was routed to the market. Latency can be measured from normal orders or from test orders. Some markets support test orders as such. For markets in which test orders as such are not supported, test orders can be implemented by use of unmarketable orders immediately followed by cancellations. For markets receiving orders regularly, latency can be tracked from normal orders, without the need for test orders. For aspects of the invention in which eligibility of markets to receive orders is based upon latency, test orders can be used to determine whether ineligible markets have become eligible.

"Level Two Quotes" are quotes that comprise one or more market participant quotes ("MPQs"). The best known source of level two quotes is Nasdaq, but "level two quotes" refers to any form of market information that aggregates market participant quotes for a security.

"Market," "electronic market," "market participant," "electronic market participant," "marketing network," and "electronic marketing network" are all used as synonyms for services accessible through electronic communications networks capable of executing orders for securities by accepting from broker-dealers buy orders and sell orders, matching or failing to match buy orders with sell orders, and communicating the results to the broker-dealers. Generally the term "market" is used to refer to these entities. All "markets," as the term is used, are either ECNs or market makers. All available markets have names and symbols as described under the definitions of "ECN" and "market maker."

"Market maker" means a broker-dealer providing order matching and liquidity in a stock by maintaining an inventory of the stock. Market makers typically trade their inventories through exchanges. Some currently active market makers, their symbols and names, are listed below. Obviously the number and identity of market makers can change at any time.

| Example List of Market Makers | |
|---|---|
| MPID | Name |
| BEST | Bear, Stearns & Co., Inc. |
| BTAB | Alex, Brown & Sons, Inc. |
| GSCO | Goldman, Sachs & Co. |
| HMQT | Hambrecht & Quist, LLC |
| HRZG | Herzog, Heine, Geduld, Inc. |
| JANY | Janney Montgomery Scott, Inc. |
| LEHM | Lehman Brothers, Inc. |
| MADF | Bernard L. Madoff |
| MLCO | Merrill Lynch, Pierce, Fenner & Smith Inc. |
| MOKE | Morgan, Keehan & Co., Inc. |
| MONT | Nationsbanc Montgomery Securities, LLC |
| MSCO | Morgan Stanley & Co., Inc. |
| NITE | Knight Securities, L.P. |
| OLDE | Olde Discount Corporation |
| OPCO | CIBC Oppenheimer Corporation |
| PIPR | Piper Jaffray Inc. |
| PRUS | Prudential Securities, Inc. |
| PWJC | Paine Webber, Inc. |
| RAJA | Raymond James & Associates, Inc. |
| SBSH | Smith Barney, Inc. |
| SHRP | Sharpe Capital, Inc. |
| SHWD | Sherwood Securities Corporation |

"MPID" abbreviates market participant identification, a code identifying market participants including ECNs and market makers.

"MPQ" abbreviates market participant quote, a quote comprising MPID, side, symbol, quantity, and price.

"Nasdaq Level Two Quotes" are provided in a data stream from Nasdaq. Nasdaq Level Two Quotes include market information for markets offering to buy or sell stocks. The market information provided in a Level Two Quote includes price, side, quantity, and market identification, comprising market participant quotes, for each market offering to buy or sell a stock listed on Nasdaq.

"National market" means Nasdaq, the New York Stock Exchange, and the American Stock Exchange. SOES and SelectNet are national-level stock trading services provided through Nasdaq.

"Natural Trader" indicates a source of securities trades, either sales or purchases, in which available quantity is larger than quoted quantity. Natural traders exist because large trade sources cannot quote their entire available quantity without artificially distorting prices due to extreme perceived fluctuations in supply or demand. Natural traders are identified by a tendency to continuously requote after trading and by filling orders with quantities larger than the quantities displayed in their quotes. It is the tendency to fill orders with order quantities larger than quoted quantities that is measured by hidden quantity ratios.

"Orders" are orders for purchase or sale of goods, services, or securities. In many of the embodiments described, "orders" are electronic orders for purchase or sale of securities.

"Quantity," in embodiments directed to securities trading, refers to quantities of securities quoted, ordered, or filled.

"Quotes" are aggregates of information regarding securities traded in markets. Quotes include for securities listed for sale or purchase, symbols identifying the securities, price, side, quantities, and market identifications or MPIDs. Quotes can come from Nasdaq or directly from markets. A "Nasdaq Level Two Quote" includes market information in the form of market participant quotes for all markets offering to buy or sell a particular security through Nasdaq.

"Rejection" refers to partial or complete termination of an order by a market or by action of the invention. "Rejection" contrasts with "cancel" in which an order is terminated by action of the customer.

"Securities" are any agreement for investment. Stocks are the securities most often addressed in described embodiments of the invention. The invention, however, is applicable to many kinds of securities including, for example, options, commodities, and bonds.

"SelectNet" is a Nasdaq system for indirect submission to market makers and to ECNs of electronic orders for stocks listed on Nasdaq. SelectNet implements orders broadcast to many markets or directed to particular selected markets. SelectNet orders for selected markets require MPIDs as parameters, the MPIDs being derived from quotes for the stock in the order. The operations of SelectNet are well-known.

"Side" refers to which side of the market is represented by an order or a quote. Side indicates whether the quote or order is to buy or sell, bid or ask. "Bid" indicates the buy side. "Ask" indicates the sell side. The present invention functions equally for either side of a transaction. Therefore we attempt to speak in neutral terms regarding side. We speak of execution rather than buying or selling. We use the term "price improvement" to indicate both price reductions for buy orders and price increases for sell orders.

"SOES" abbreviates "Small Order Execution System," a Nasdaq system for indirect submission to market makers of electronic orders for national stocks. Unlike SelectNet, SOES always operates by automatically selecting a market maker or ECN to receive an order. In contrast with SelectNet, therefore, SOES orders never require an MPID parameter. Like SelectNet, the details of SOES operations and procedures are public and well-known.

"Solution" refers to a set of sub-solutions or solution records each of which identifies at least one specific partial solution to a problem. Solutions records in typical embodiments are related to records representing problem definitions. Problem definitions in many embodiments comprise data elements identifying particular problems and types of problems. A set of records comprising a solution is either complete or incomplete. In embodiments directed to generating solutions for problems related to securities trading, for example, a solution comprises a set of solution records identifying markets where particular securities are currently available for purchase or sale at particular prices. Such solutions records typically are related to records representing securities problem definitions. Securities problem definitions in such embodiments typically comprise a problem definition type, symbol, quantity, and side. The set of records comprising a solution in such embodiments is either complete or incomplete. Complete solutions for many embodiments directed to solving problems of securities trading are sets of solution records the sum of whose quantities is equal or greater than the quantity in a related problem definition record. Incomplete solutions are solutions record sets the sum of whose quantities is less than the quantity in the corresponding problem definition.

"Solution server" refers to embodiments of the invention capable of generating problem definitions for problems whose solutions depend upon environmental information, receiving the environmental information needed to generate solutions, generating solutions, entering or registering client subscriptions for types of solutions, retrieving solutions for types of problems identified in subscriptions, and communicating the solutions to clients.

DETAILED DESCRIPTION

Turning now to FIG. 1, a first aspect of the invention is seen, a method of providing solutions to problems (12). One illustrated embodiment provides for generating problem definitions (18) for problems (12), receiving environmental information (16) required for generating solutions for the problems, generating solutions (19) for the problems dependent upon the environmental information and the problem definitions, and communicating solutions (24) to clients (26) before the solutions are needed. Although the invention can be applied to a wide range of problems, in certain embodiments, the generated problem definitions are for problems related to securities trading.

Figure 1A:
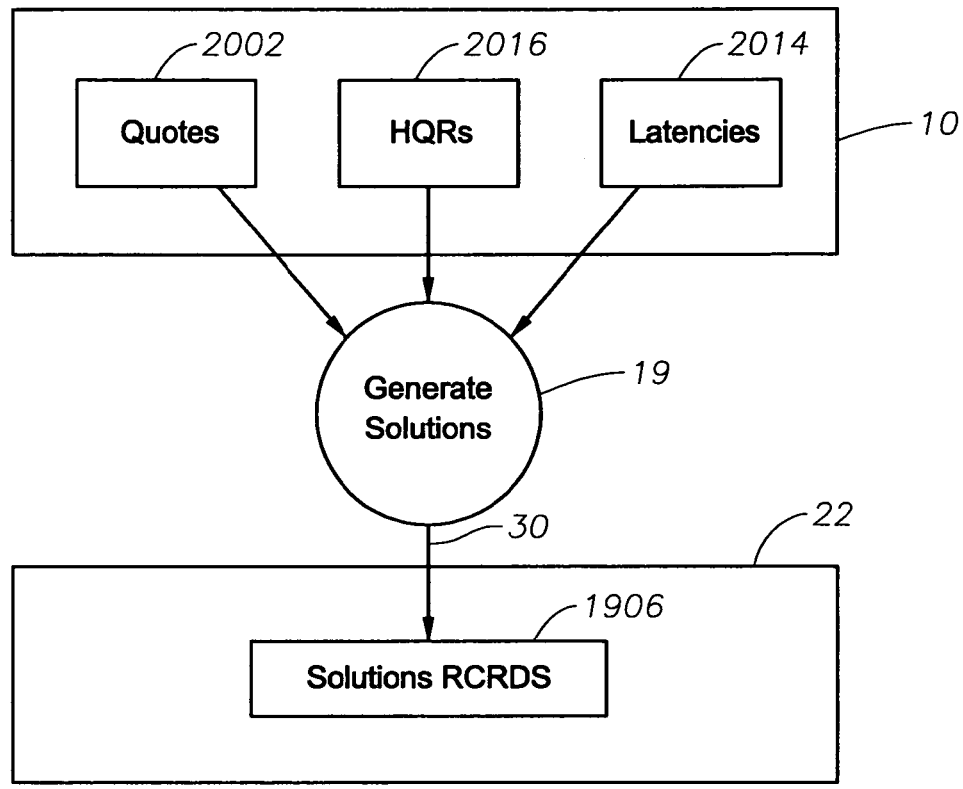

An example embodiment, directed to generating solutions for securities trading, is shown in FIG. 1A, in which generating solutions (19) is accomplished in dependence upon environmental information (10) comprising quotes (2002) from securities markets, hidden quantity ratios (2016), and latencies (2014). In many such embodiments, solutions include solution quantities calculated dependent upon quote quantities and hidden quantity ratios. In many such embodiments, solutions comprise solution records sorted or indexed according to latencies for markets identified by MPIDs in the solution records. In the embodiment shown in FIG. 1A, generated solutions are stored (30) in solutions records (1906) in a database (22).

A further embodiment shown in FIG. 1 includes storing problem definitions (29) in problem definition records in a database (22). The problem definition records (314) in many embodiments are disposed in the database (22) as shown on FIG. 2. An example structure for problem definition records is shown as reference (314) in FIG. 2G.

A further embodiment illustrated in FIG. 1 includes storing the solutions (30) in solutions records in the database (22). The solution records (316) in many embodiments are disposed in the database (22) as shown on FIG. 2. An example structure for solutions records is shown as reference (316) in FIG. 2F. In typical embodiments, the solutions records (316) have at least one relation (315) to the problem definition records (314), one example of which is shown on FIG. 2.

A still further embodiment shown on FIG. 1 includes retrieving (32) at least one solution from the solutions records in the database (22). In some embodiments illustrated by FIG. 1, at least one client (26) is a broker-dealer computer system programmed and operated to effect securities trading.

Some embodiments illustrated by FIG. 1, when received environmental information (10) changes, include generating additional solutions (19) dependent upon the changed environmental information and the problem definitions and communicating (24) additional solutions to clients before the additional solutions are needed. In many embodiments, problems are categorized according to type, an example of which is the use of the probdeftype field (202) in the problem definition structure (314) shown in FIG. 2G.

Figure 2:
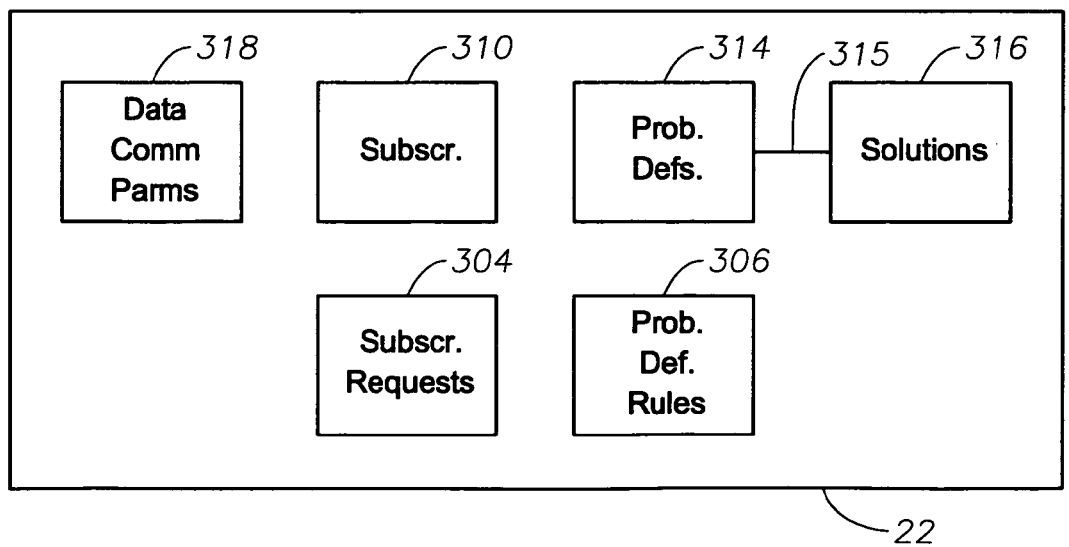
FIG. 2 is a block diagram of files of records in a database typical of certain embodiments.
Figure 2A:
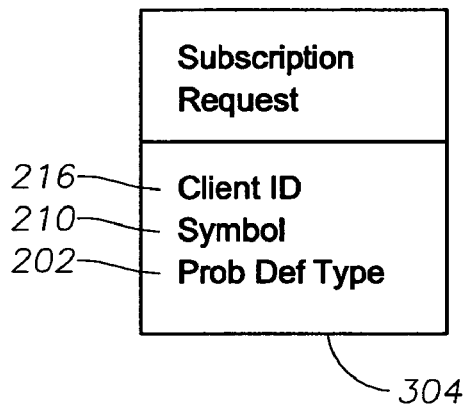
FIG. 2A is an example data structure diagram for subscription requests.

In a still further embodiment, as shown on FIG. 1, the invention includes generating subscriptions (20) for solutions, the subscriptions comprising relations between clients and types of problems. An example of an embodiment implementing a relation between clients and types of problems is the subscription structure (310) in FIG. 2D, where the subscription comprises data elements identifying a client (216) and a problem type (202).

Figure 2D:
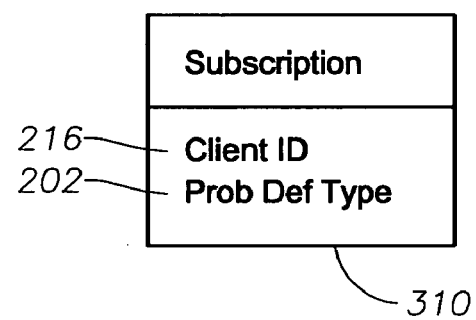
FIG. 2D is an example data structure diagram for subscriptions.
Figure 2E:
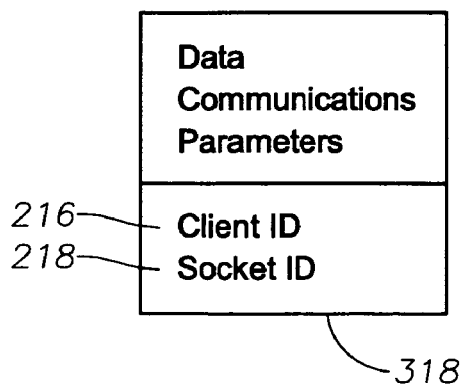
FIG. 2E is an example data structure diagram for data communications parameters.
Figure 3:
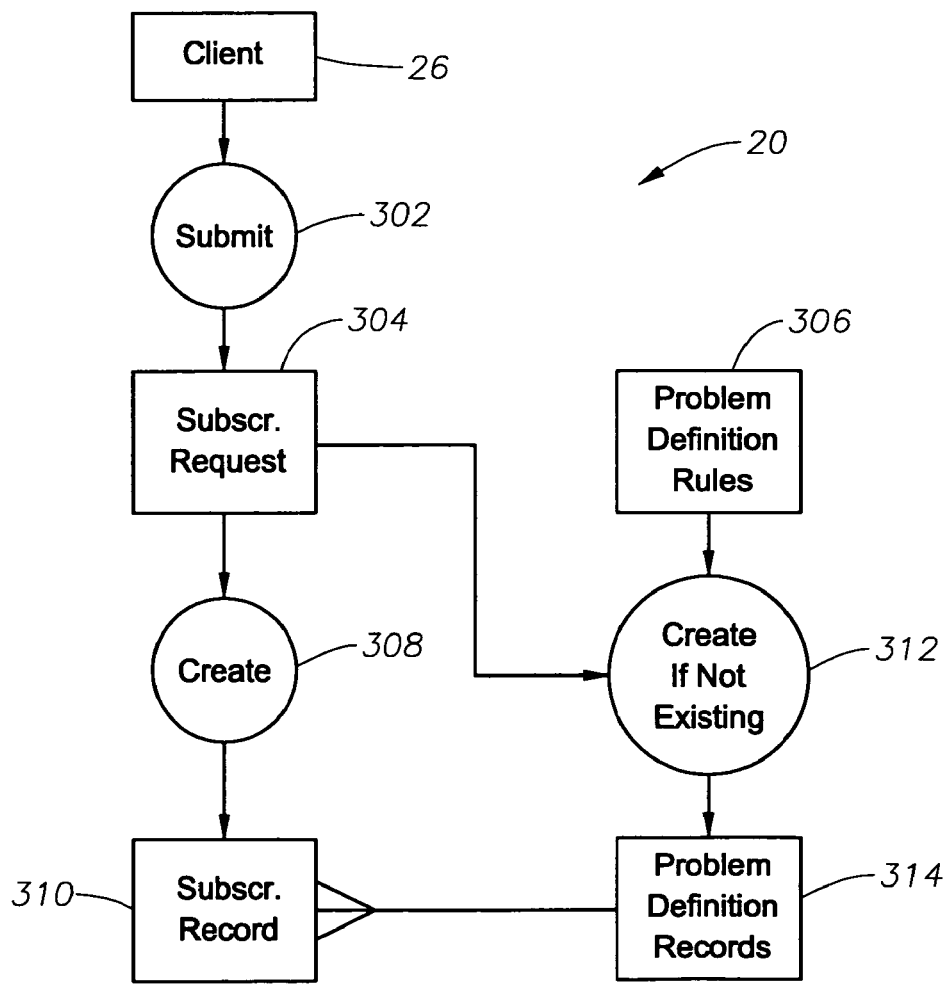
FIG. 3 is an example data flow diagram for subscription entry.

Referring to FIG. 3, a still further embodiment of the invention is seen. One embodiment shown in FIG. 3 includes submitting (302) a request (304) for a subscription. A still further embodiment illustrated at FIG. 3 provides for creating (308) a subscription record (310) in response to the submission (302) of the request (304) for a subscription. A typical example of a subscription record (310), shown at FIG. 2D, comprises data elements identifying a client (216) and a problem type (202).

Figure 2B:
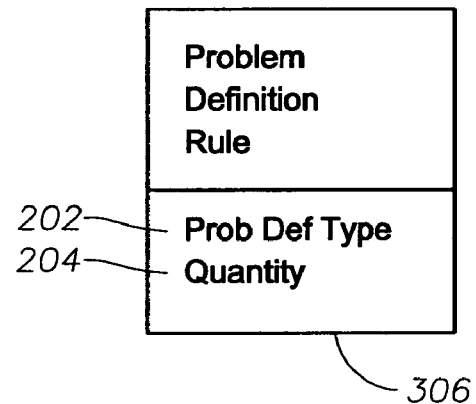
FIG. 2B is an example data structure diagram for problem definition rules.
Figure 2C:
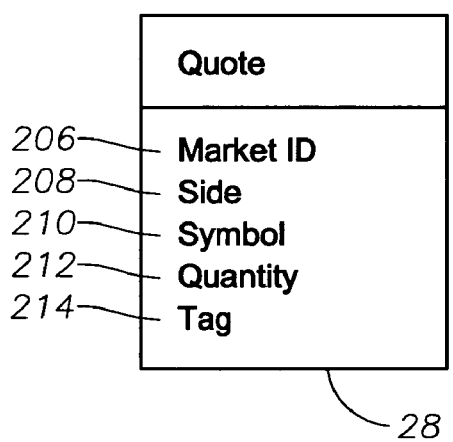
FIG. 2C is an example data structure diagram for quotes.
Figure 2F:
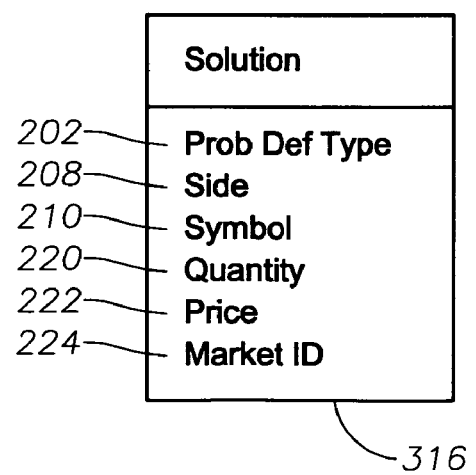
FIG. 2F is an example data structure diagram for solutions.
Figure 2G:
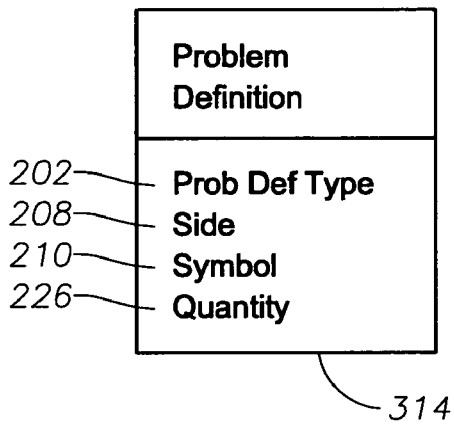
FIG. 2G is an example data structure diagram for problem definitions.

A still further embodiment illustrated at FIG. 3 provides for creating (312) at least one problem definition (314) record dependent upon problem definition rules (306). An example problem definition data structure used in many embodiments directed to securities trading is illustrated in FIG. 2G as comprising problem definition type (202), side (208), symbol (210), and quantity (226). An example problem definition rule structure used in many embodiments directed to securities trading is illustrated in FIG. 2B as comprising problem definition type (202) and quantity (204).

Figure 4:
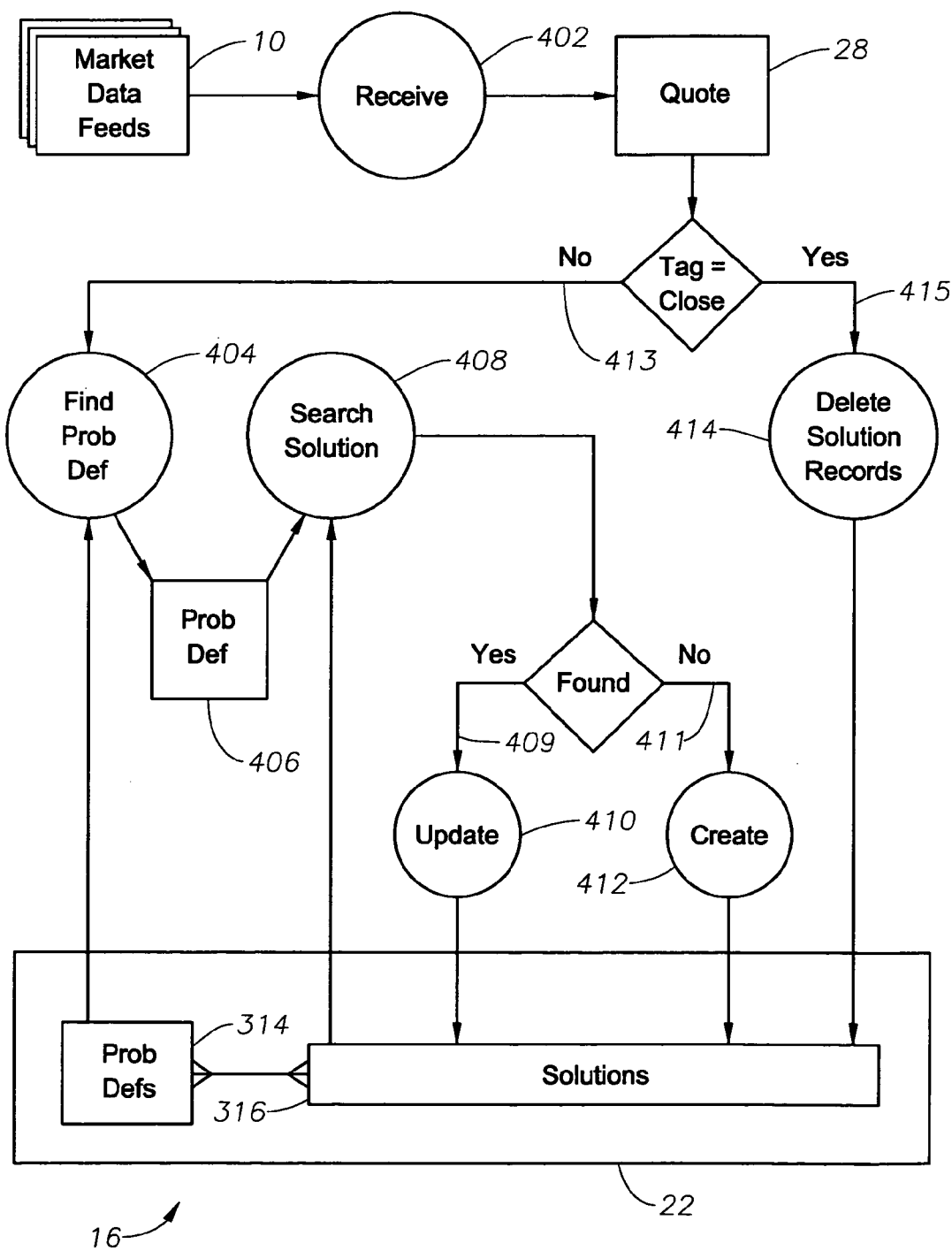
FIG. 4 is an example data flow diagram for solution generation.

Turning now to FIG. 4, a further embodiment of the invention is seen. One embodiment illustrated at FIG. 4 includes receiving environmental information which in the illustrated embodiment comprises market information (402) in the form of quotes (28), the quotes (28) comprising data elements representing side (208), symbol (210), quantity (212), market (206), and a tag (214) as shown in FIG. 2C. The tag (214) is an indication of the status of the quote, including, for example, whether the quote is an open quote or a closed quote.

In a further embodiment illustrated at FIG. 4, the invention provides, when a quote is received and the quote tag does not indicate (413) that the quote is closed, finding a problem definition record (404) having the same side and symbol as the quote. In a still further embodiment shown in FIG. 4, the invention provides for searching for a solution record (408) having the same problem type, side, and symbol as the problem definition record having the same side and symbol as the quote and the same market as the quote.

When the solution record is found (409), the illustrated embodiment includes updating the solution record (410) with the price from the quote. When the solution record is not found (411), the illustrated embodiment includes creating a new solution record (412) having the same problem type, side, and symbol as the problem definition record having the same side and symbol as the quote, the same market as the quote, and the same price as the quote. When a quote is received and the quote tag indicates that the quote is closed (415), the illustrated embodiment includes deleting (414) solution records having the same side, symbol, and market as the quote.

Figure 4A:
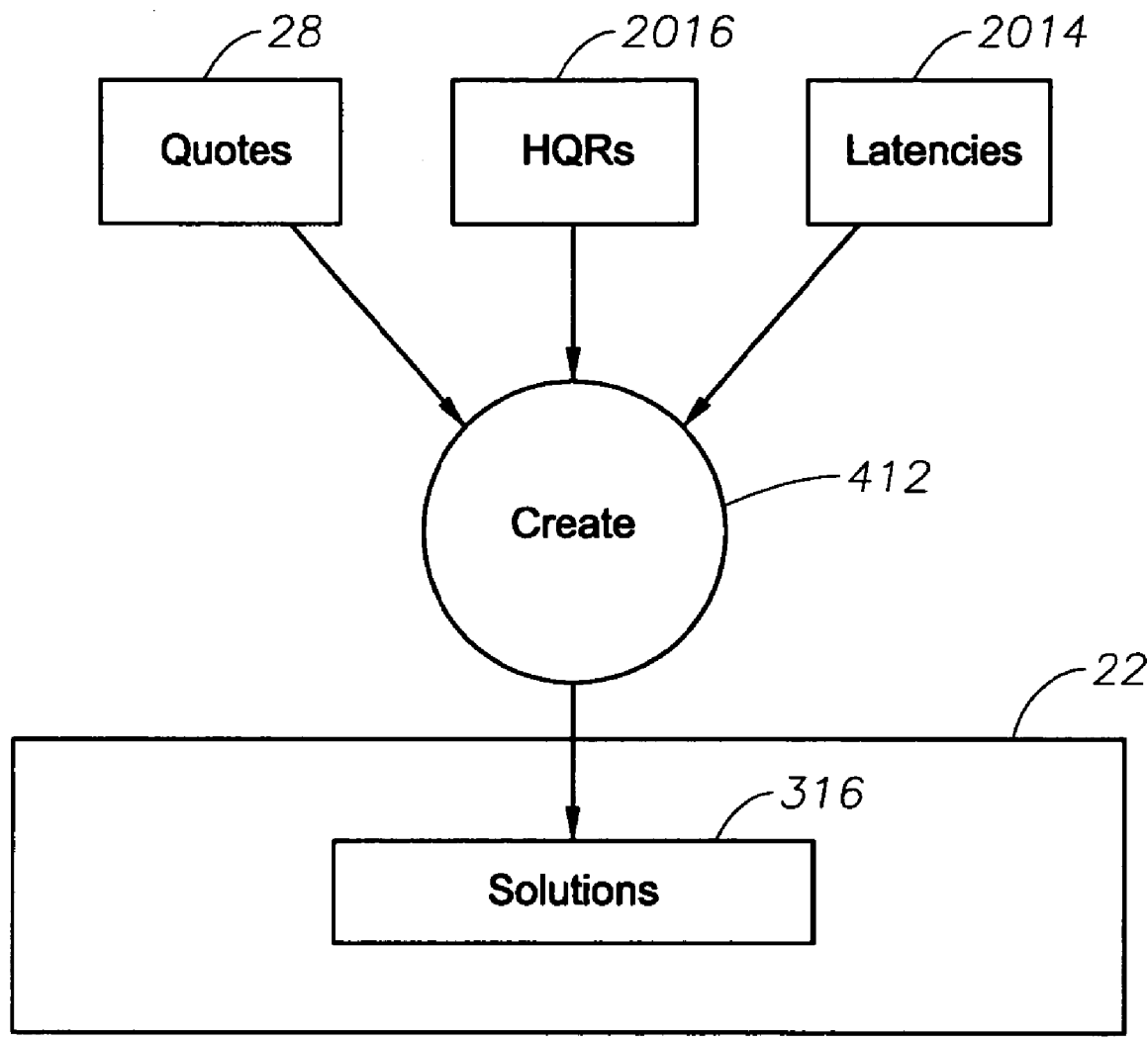

An additional example embodiment, directed to solutions for securities trading, is shown in FIG. 4A, in which creating solutions (412) is accomplished in dependence upon quotes (2002) from securities markets, hidden quantity ratios (2016), and latencies (2014). In many such embodiments, solutions include solution quantities calculated dependent upon quote quantities and hidden quantity ratios. In many such embodiments, solutions comprise solution records sorted or indexed according to latencies for markets identified by MPIDs in the solution records. In the embodiment shown in FIG. 4A, generated solutions are stored (30) in solutions records (1906) in a database (22).

Figure 5:
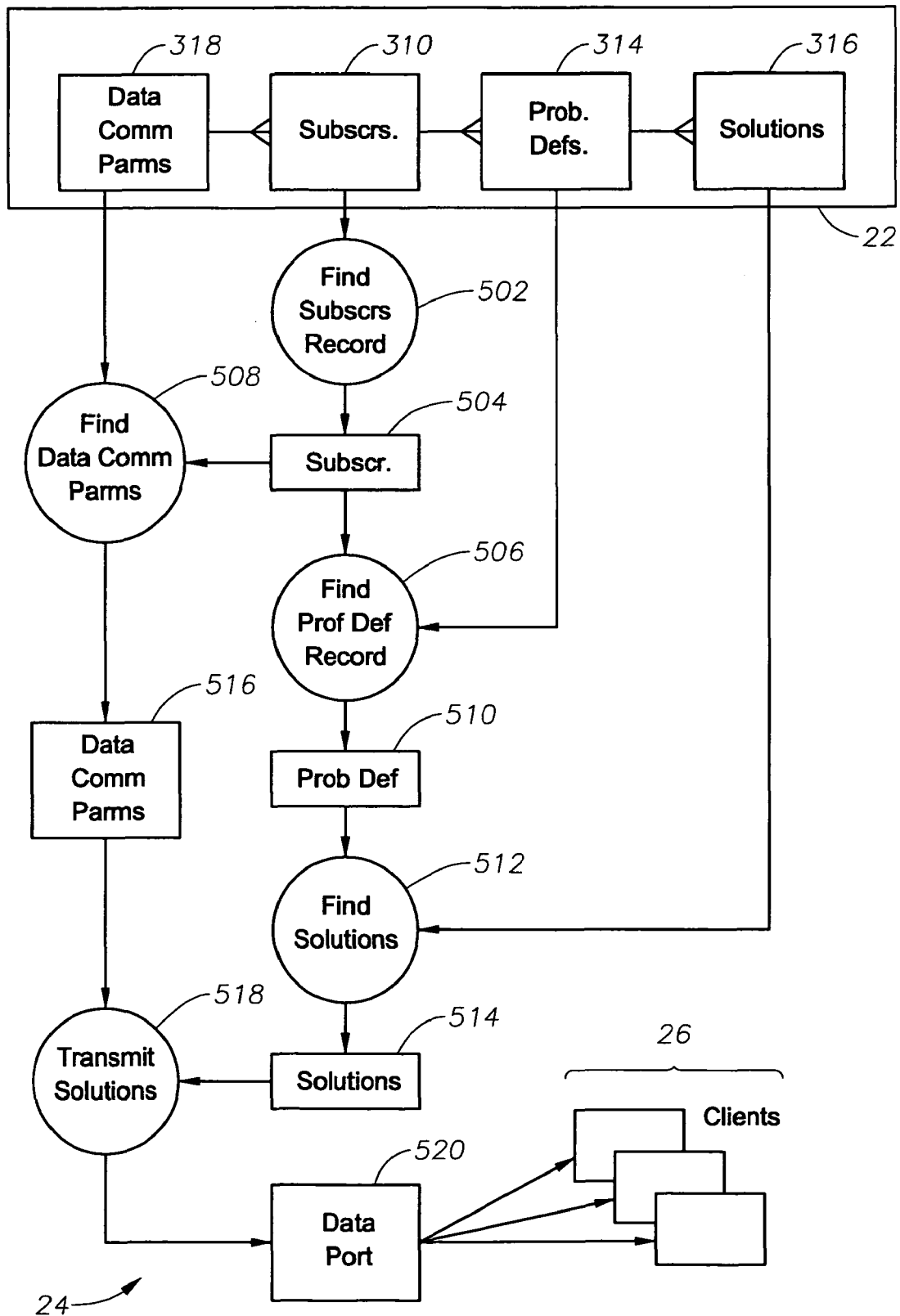
FIG. 5 is an example data flow diagram for solution retrieval and transmission.

Turning to FIG. 5, a still further embodiment of the invention is seen. One embodiment shown in FIG. 5 includes repeatedly finding (502) a subscription record so that each existing subscription record (310) is found in turn. When a subscription record (504) is found, the illustrated embodiment includes finding (508), for each found subscription record (310), a related record of data communications parameters (516) for the client identified in the found subscription record (504).

For each found subscription record (504), the illustrated embodiment includes finding (506) at least one related problem definition record (510). When at least one problem definition record (510) is found, the embodiment of FIG. 5 includes finding (512), for each found problem definition record (510), at least one related solution record (514). A still further embodiment, as shown on FIG. 5, provides for communicating (518, 520), dependent upon data communication parameters identified in the found record of data communications parameters (516), to the client (26) identified in the found subscription record (504) at least one data element of the found solution record (514).

Figure 6:
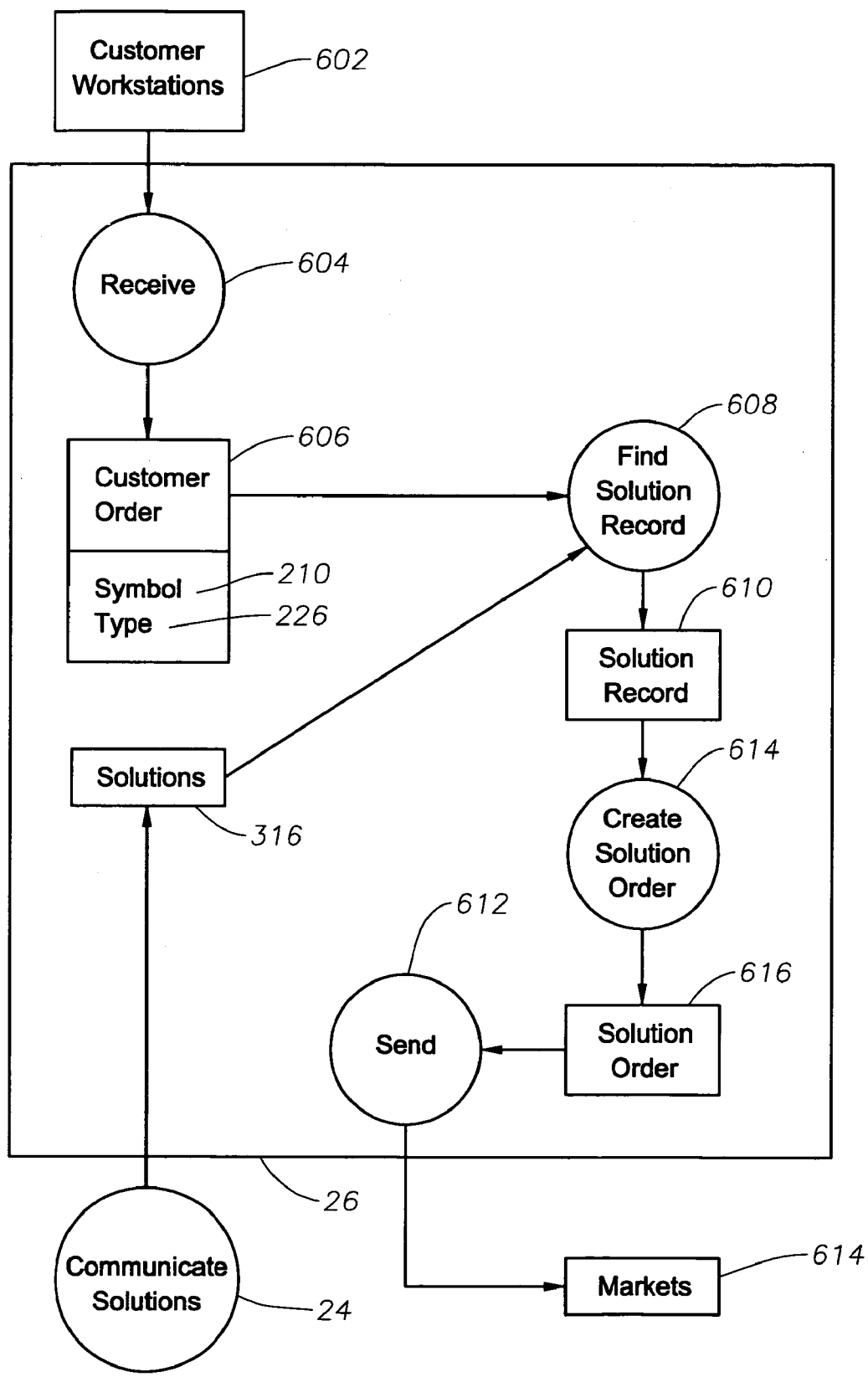
FIG. 6 is an example process flow overview for order execution.

Turning to FIG. 6, still further embodiments of the invention are seen. One embodiment illustrated at FIG. 6 includes communicating solutions (24) to clients as communicating solutions to an order processing system (26) on a broker-dealer computer. A further embodiment shown on FIG. 6 includes receiving (604) at least one customer order (606). The customer order, illustrated in detail at reference 606 on FIG. 2H, comprises data elements identifying symbol (210), quantity (228), and optionally, price (230), market (224), and order type (226). In many embodiments, the customer order type has a relation to a problem type. Problem types as used in typical embodiments are illustrated at reference (202) in solution structure (316) on FIG. 2F. A still further embodiment illustrated in FIG. 6 includes finding (608) at least one solution record (610) having the same symbol (210) as the received customer order (606) and also having a problem type related to the customer order type (226) in the received customer order (606).

A still further embodiment illustrated in FIG. 6 includes sending (612) to at least one market (614) at least one solution order (616), the solution order being dependent upon the customer order and the data in the found solution record (610). A still further embodiment illustrated in FIG. 6 includes sending (612) to at least one market (614) at least one solution order (616), the solution order comprising the side, symbol, quantity, price, and market data elements from the found solution record (610).

Figure 7:
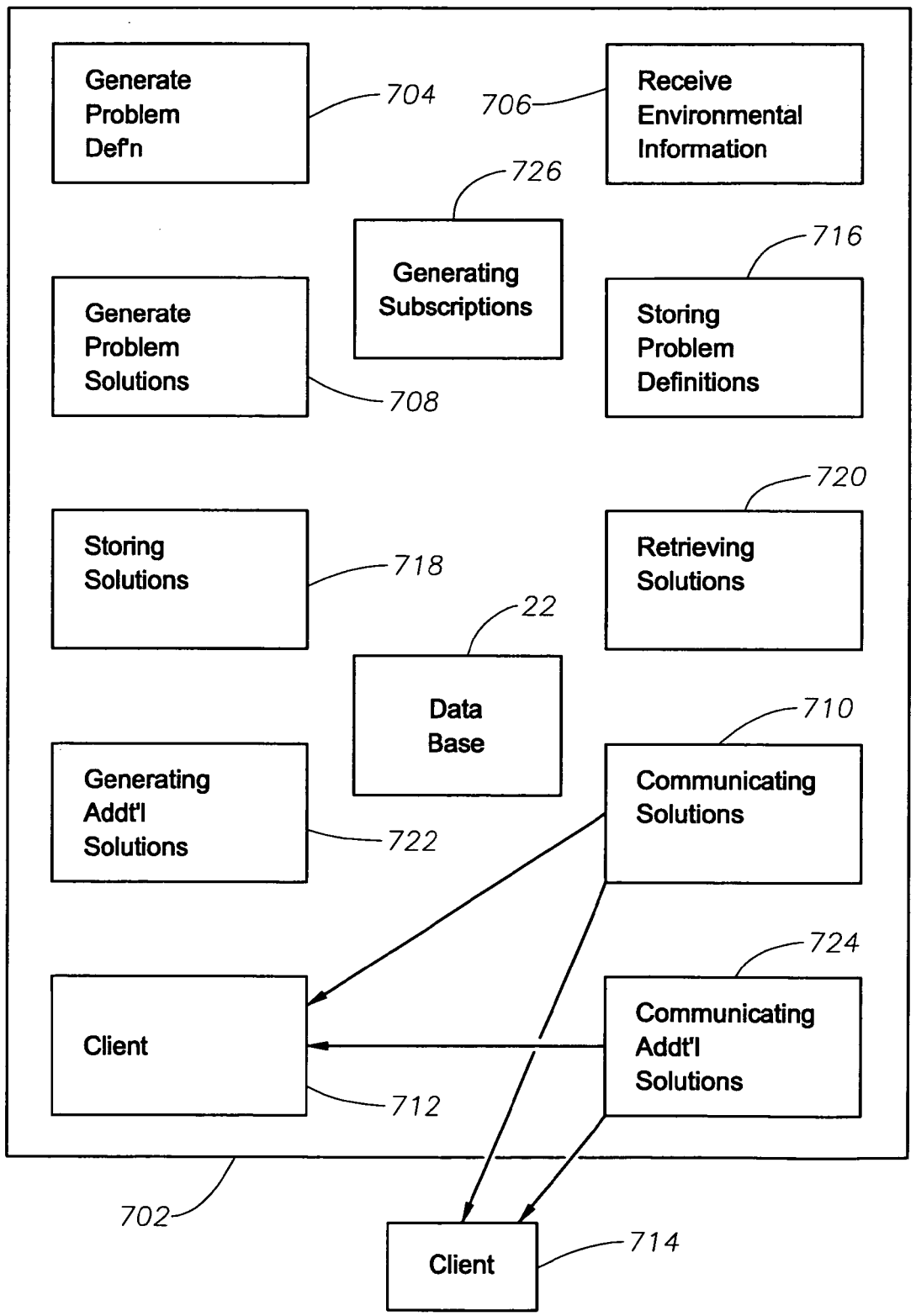
FIG. 7 is an example means structure diagram for certain embodiments of a solution server.

Turning to FIG. 7, a further aspect of the invention is seen, that is, a system (702) for providing solutions to problems.

One embodiment shown in FIG. 7 includes means for generating problem definitions (704) for problems, means for receiving environmental information (706) required for generating solutions for the problems, means for generating solutions (708) for the problems dependent upon the environmental information and the problem definitions, and means for communicating solutions (710) to clients before the solutions are needed.

The means for generating problem definitions (704) in typical embodiments is a computer programmed to store problem definitions in a data structure in computer memory. An example of such a data structure is provided at reference (314) in FIG. 2G. The means for receiving environmental information (706) in typical embodiments is a computer programmed to receive a data stream through a data communications port, typically, not always, connected to a network. An example of such a data stream is a Nasdaq feed, a stream of ticker information or quotes provided to subscribers by Nasdaq.

The means for generating solutions (708) for the problems dependent upon the environmental information and the problem definitions in typical embodiments is a computer programmed to generate and store solutions in a data structure in computer memory. An example of such a data structure is provided at reference (316) in FIG. 2F.

The means for communicating solutions (710) to clients before the solutions are needed, in typical embodiments, is a computer programmed to retrieve solutions from computer memory and transmit through a communications port, often over networks, to clients. In other embodiments, at least one of the clients is closely coupled to the system for providing solutions, with communicating solutions structured through shared memory, software subroutine calls, or calls to member functions in class objects.

In some embodiments clients (712) are implemented in the same overall computer system (702) as the system (702) for providing solutions to problems. Other embodiments have clients (714) as separate entities. Still other embodiments have other relations between the system for providing solutions and clients, all which relations are within the scope of the present invention.

In some embodiments implemented as shown in FIG. 7, the problem definitions are for problems related to securities trading. A further embodiment provides means for storing the problem definitions (716) in problem definition records in a database (22).

A still further embodiment provides means for storing the solutions (718) in solutions records in the database (22). The means for storing the problem definitions and means for storing solutions, in the illustrated embodiment, is computer memory coupled to a processor. The computer memory has various forms in various embodiments, including random access memory, magnetic disk drives, read only memory, programmable read only memory, and erasable programmable read only memory. Means for storing takes many forms in computer memory, all within the scope of the invention.

In many embodiments, the solutions records have at least one relation to the problem records, for example, one-to-many or many-to-many. Other relations are used in other embodiments, all within the scope of the invention. A still further embodiment provides means for retrieving at least one solution (720) from the solutions records in the database. Means for retrieving in typical embodiments is a computer processor coupled to computer memory and programmed to search the memory. In some embodiments, at least one client (712, 714) is a broker-dealer computer system programmed and operated to effect securities trading.

A still further embodiment illustrated on FIG. 7 provides for use when received environmental information changes means for generating additional solutions (722) dependent upon the changed environmental information and the problem definitions and means for communicating additional solutions (724) to clients before the additional solutions are needed. In many embodiments of the kind illustrated on FIG. 7, problems are categorized according to type.

A still further embodiment shown in FIG. 7 provides means for generating subscriptions (726) for solutions, the subscriptions comprising relations between clients and types of problems. Means for generating subscriptions in such embodiments include available data entry screens for entering data into a computer, the data being received by a computer processor capable of storing the subscriptions in computer memory.

Figure 8:
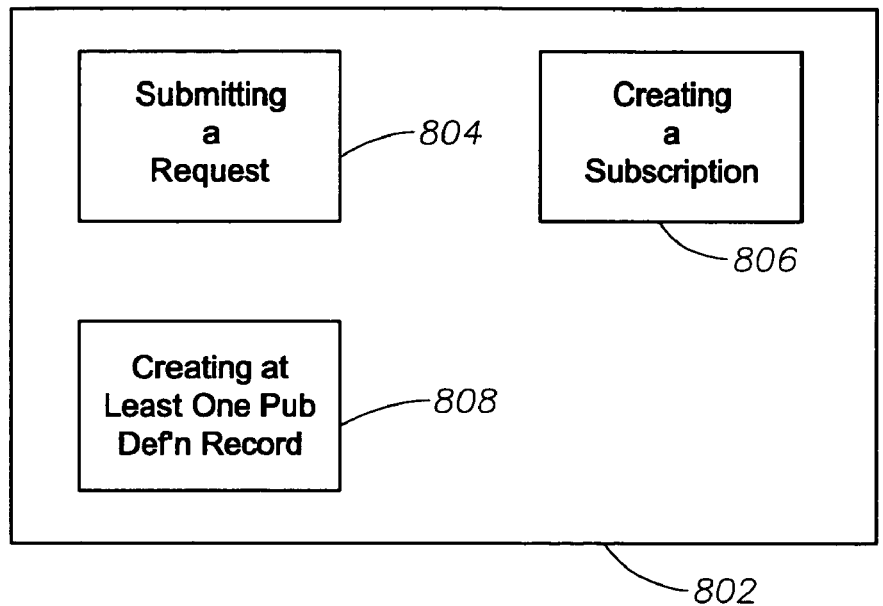
FIG. 8 is an example means structure diagram for subscription entry.

Turning now to FIG. 8, a further aspect of the invention is seen. FIG. 8 shows an embodiment providing means for submitting a request (804) for a subscription. Means for submitting a request for a subscription in such embodiments include available data entry screens for entering data into a computer, the data being received by a computer processor capable of storing the subscriptions in computer memory.

A further embodiment shown on FIG. 8 provides means for creating (806) a subscription record in response to the submission of the request for a subscription. Means for creating a subscription record in such embodiments include a computer processor programmed to create and store the subscription record in computer memory. In many such embodiments, the subscription record comprises data elements identifying a client and a problem type.

A still further embodiment shown on FIG. 8 provides means for creating (808) at least one problem definition record dependent upon problem definition rules. Means for creating a problem definition record in such embodiments include a computer processor programmed to read rules from a computer memory store of problem definition rules and create and store a problem definition record in computer memory. In many such embodiments, the problem record comprises data elements identifying problem type, side, symbol, and quantity.

Figure 9:
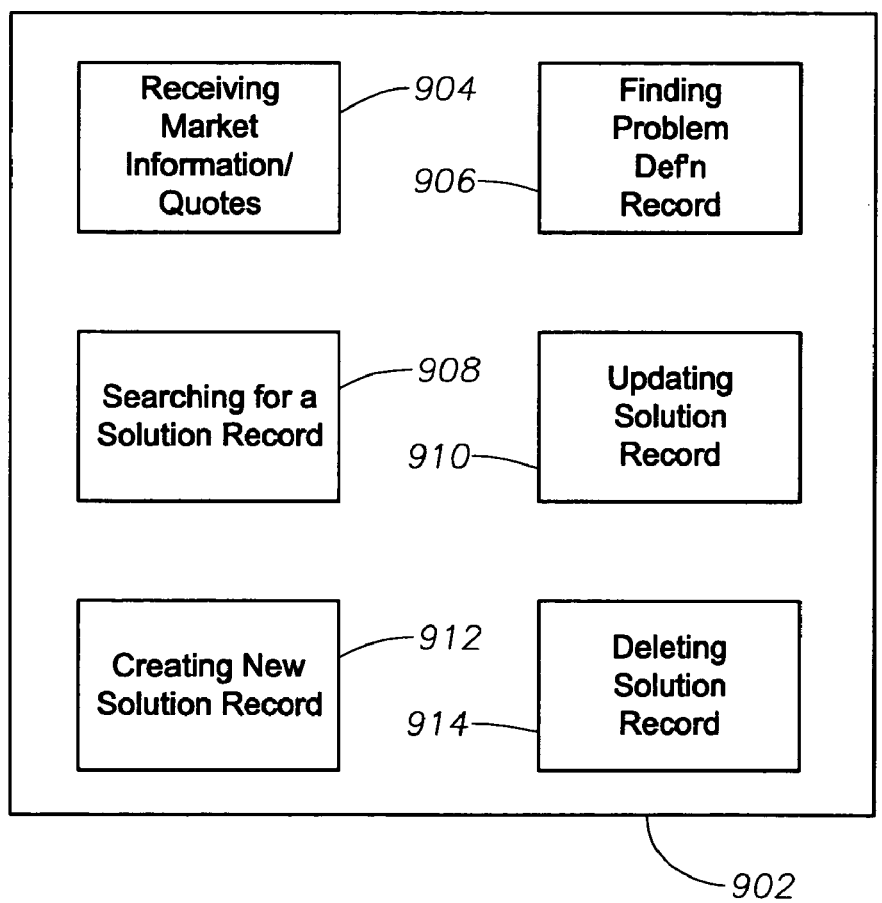
FIG. 9 is an example means structure diagram for solution generation.

Turning now to FIG. 9, a further embodiment of the invention is seen. An embodiment shown in FIG. 9 provides means for receiving environmental information comprising means for receiving (904) market information in the form of quotes, the quotes typically comprising, as shown in FIG. 2C, data elements of side (208), symbol (210), quantity (212), market (206), and a tag (214), the tag being a status code for the quote. Means for receiving market information, in embodiments similar to the ones illustrated in FIG. 9, include ticker feeds, quote feeds, and market data feeds from Nasdaq and from other exchanges, as well as similar feeds from ECNs, market makers, other markets, and other broker-dealers.

A further embodiment of the invention, shown on FIG. 9, provides, for use when a quote is received and the quote tag does not indicate that the quote is closed, means for finding (906) a problem definition record having the same side and symbol as the quote. Means for finding a problem definition record in such embodiments include a computer processor programmed to search through problem definition records in a table or database using established search criteria.

A further embodiment of the invention, shown on FIG. 9, provides means for searching is (908) for a solution record having the same problem type, side, and symbol as the problem definition record having the same side and symbol as the quote and the same market as the quote. Means for searching for a solution record in such embodiments include a computer processor programmed to search through solution records in a table or database using established search criteria.

A further embodiment, shown on FIG. 9, provides, for use when a solution record is found, means for updating (910) the solution record with the price from the quote. Means for updating the solution record, in many such embodiments, is a computer processor programmed to write the updated price into a price field or data element in the solution record, data structure, or class object in computer memory.

A further embodiment, shown on FIG. 9, provides, for use when the solution record is not found, means for creating (912) a new solution record having the same problem type, side, and symbol as the problem definition record having the same side and symbol as the quote, the same market as the quote, and the same price as the quote. In such embodiments, means for creating a new solution record typically comprise a computer processor programmed to create a data structure having defined data elements and write into those data elements the information from the quote and the problem definition record. An example of such a data structure is shown at reference 316 on FIG. 2F. The example of FIG. 2F is directed to solutions for problems of securities trading and includes data elements of problem type (202), side (208), symbol (210), quantity (220), price (222), and market identification code (224).

A still further embodiment shown on FIG. 9 provides, for use when a quote is received and the quote tag indicates that the quote is closed, means for deleting (914) solution records having the same side, symbol, and market as the quote. Means for deleting solution records in such embodiments include a computer processor programmed to search through solution records in a table or database using established search criteria, locate records meeting the criteria, and delete those records from the table or database, or alternatively, mark the records as not in use.

Figure 10:
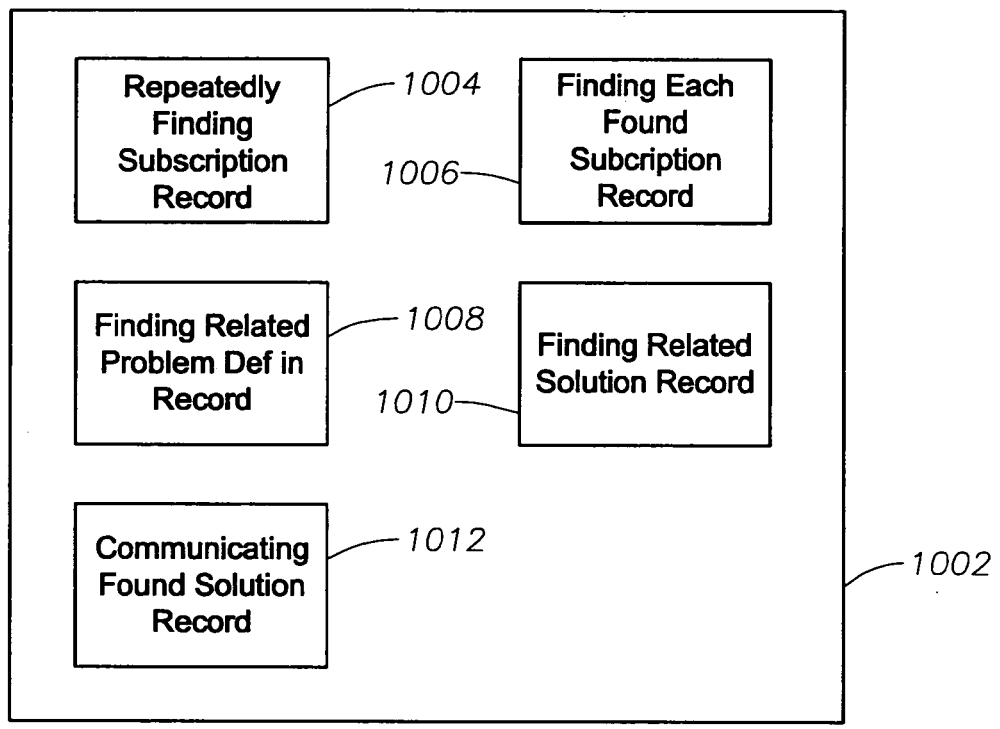
FIG. 10 is an example means structure diagram for solution retrieval and transmission.

Turning now to FIG. 10, a further embodiment is seen to provide means for repeatedly finding (1004) a subscription record so that each existing subscription record is found in turn. Means for repeatedly finding a subscription record in such embodiments include a computer processor programmed to search through subscription records in computer memory, said computer memory including, in various embodiments, arrays, linked lists, linked lists of pointers to other structures, tables, and databases.

A still further embodiment, shown on FIG. 10, provides means for finding (1006), for each found subscription record, a related record of data communications parameters for the client identified in the found subscription record. Means for finding a related record of data communications parameters in such embodiments include a computer processor programmed to search through records of data communications parameters in computer memory, said computer memory including, in various embodiments, arrays, linked lists, linked lists of pointers to other structures, tables, and databases.

A still further embodiment, shown on FIG. 10, provides means for finding (1008), for each found subscription record, at least one related problem definition record. Means for finding a related problem definition record in such embodiments include a computer processor programmed to search through problem definition record in computer memory, said computer memory including, in various embodiments, arrays, linked lists, linked lists of pointers to other structures, tables, and databases.

A still further embodiment, shown on FIG. 10, provides, for use when at least one problem definition record is found, means for finding (1010), for each found problem definition record, at least one related solution record. Means for finding a related solution record in such embodiments include a computer processor programmed to search through solutions records in computer memory, said computer memory including, in various embodiments, arrays, linked lists, linked lists of pointers to other structures, tables, and databases.

A still further embodiment, shown on FIG. 10, includes means for communicating (1012), dependent upon data communication parameters identified in the found record of data communications parameters, to the client identified in the found subscription record at least one data element of the found solution record. Means for communicating data from a solution record in such embodiments include data communications ports, networks, satellite links, dedicated phone lines, intranets, internets, and extranets coupling the search processor to at least one client.

Figure 11:
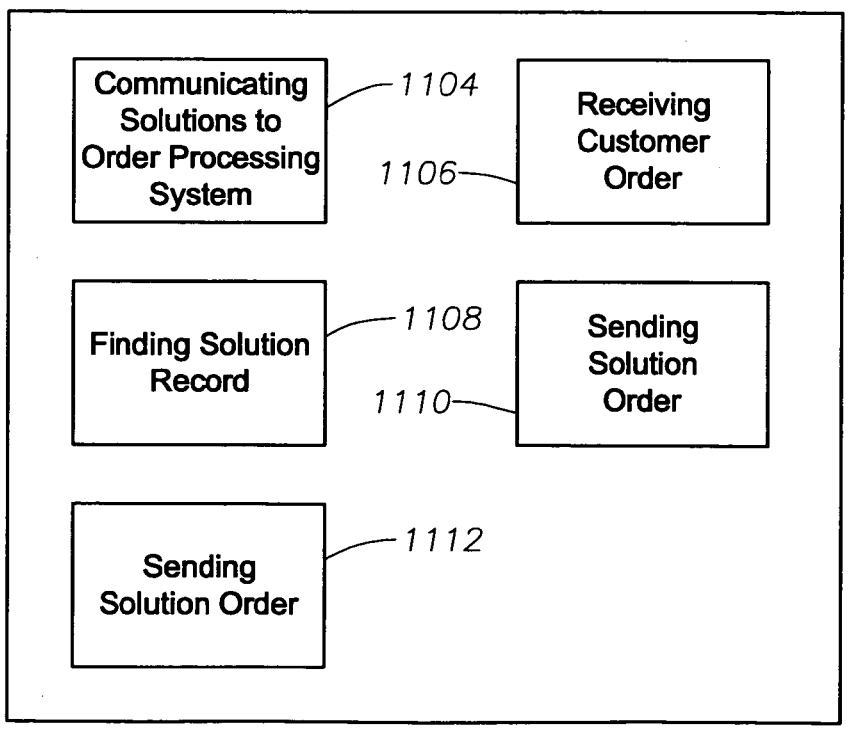
FIG. 11 is an example means structure diagram for order execution.

Turning now to FIG. 11, further embodiments of the invention are seen. FIG. 11 shows one embodiment providing means for communicating solutions to clients further comprising means for communicating (1104) solutions to an order processing system on a broker-dealer computer. Means for communicating data from a solution record in such embodiments include data communications ports, networks, satellite links, dedicated phone lines, intranets, internets, and extranets coupling the search processor to at least one broker-dealer computer.

A further embodiment shown on FIG. 11 provides means for receiving (1106) at least one customer order. The means for receiving an order in such embodiments typically includes customer workstations coupled to an order processing system, the coupling effected typically through data communications ports, networks, satellite links, dedicated phone lines, intranets, internets, and extranets coupling the search processor to at least one broker-dealer computer.

Figure 2H:
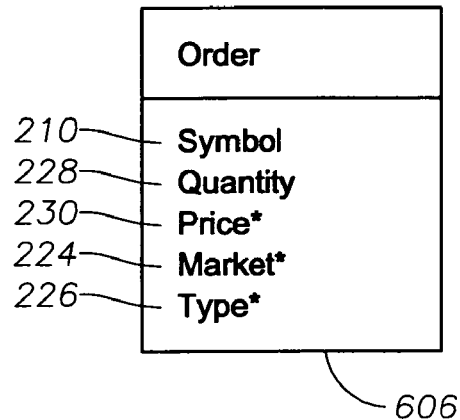
FIG. 2H is an example data structure diagram for orders.

In such embodiments, the customer order typically comprises data elements identifying symbol (210), quantity (228), and optionally, price (230), market (224), and order type (226), as shown on FIG. 2H. In many embodiments of the invention as it relates to processing systems for securities, the customer order type has a relation to a problem type, including, for example, the order type having a one to one correspondence with a problem type. All relations between order type and problems type are within the invention.

A further embodiment, shown on FIG. 11, provides means for finding (1108) at least one solution record having the same symbol as the received customer order and also having a problem type related to the customer order type in the received customer order. Means for finding at least one solution record in such embodiments includes a computer processor programmed to search through solutions records in computer memory, said computer memory including, in various embodiments, arrays, linked lists, linked lists of pointers to other structures, tables, and databases.

A still further embodiment, shown on FIG. 11, provides means for sending (1110) to at least one market at least one solution order, the solution order being dependent upon the customer order and the data in the solution record. Means for sending the solution order in such embodiments include data communications ports, networks, satellite links, dedicated phone lines, intranets, internets, and extranets coupling the search processor to at least one market.

A still further embodiment, shown on FIG. 11, provides means for sending (1112) to at least one market at least one solution order, the solution order comprising the side, symbol, quantity, price, and market data elements from the found solution record. Means for sending the solution order in such embodiments include data communications ports, networks, satellite links, dedicated phone lines, intranets, internets, and extranets coupling the search processor to at least one market.

Figure 12:
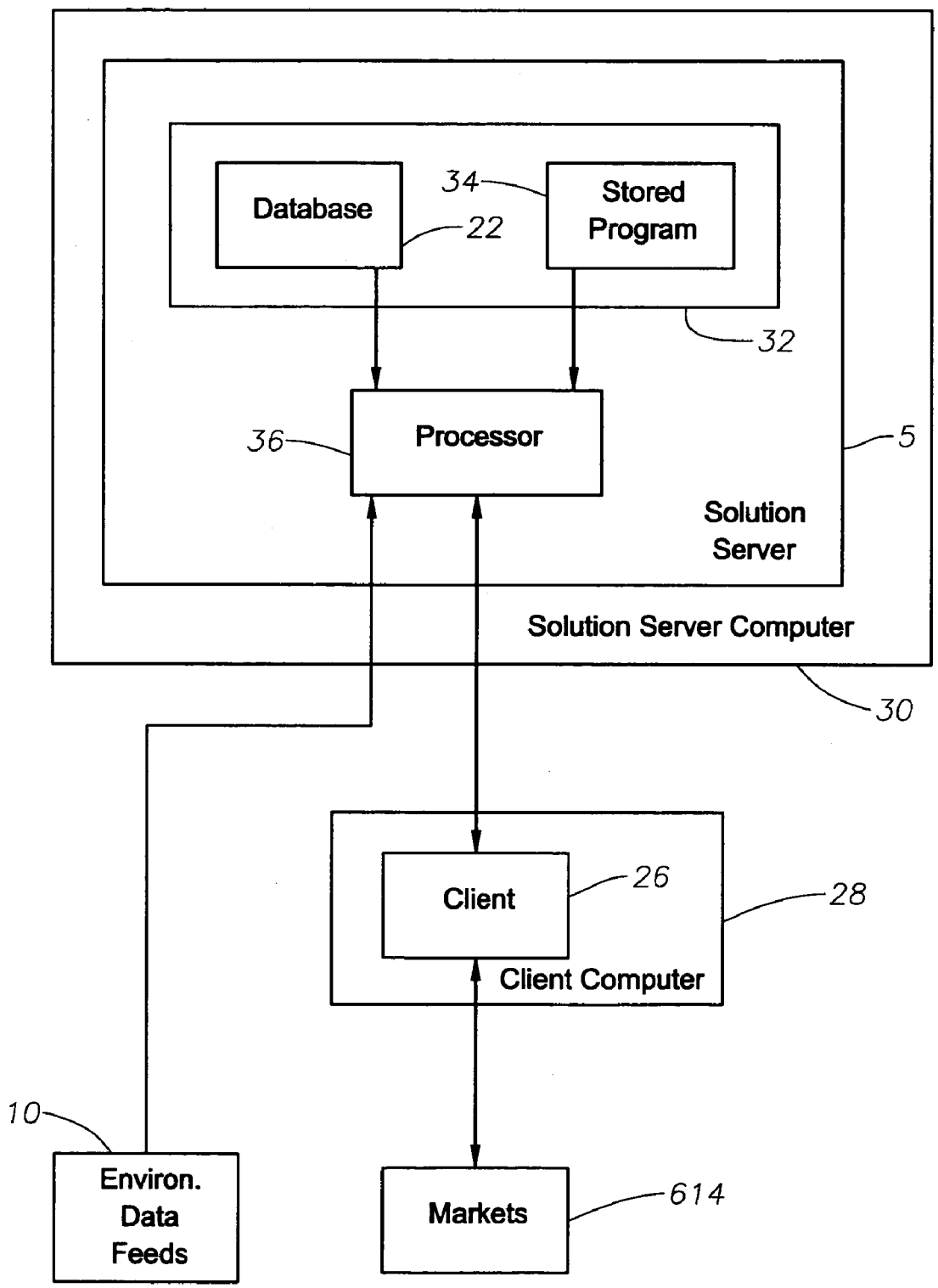
FIG. 12 is an example structural block diagram typical of certain embodiments.

Turning to FIG. 12, a further aspect of the invention is seen, that is, a solutions server. One embodiment of a solutions server, illustrated at FIG. 12, includes a processor (36) coupled to at least one source of environmental information (10) and coupled also to at least one client (26). The processor (36) is programmed, in one embodiment illustrated in FIG. 14, to generate problem definitions (1304) for problems, receive environmental information (1302) required for generating solutions for the problems, generate solutions (1306) for the problems dependent upon the environmental information and the problem definitions, and communicate solutions (1308) to clients before the solutions are needed. The solutions server of FIG. 12 includes also a memory (32) coupled to the processor (36), the processor being programmed also to store (1310) in the memory problem definitions and solutions. Although the solutions server aspect of the invention is useful for many different kinds of problems, many embodiments of the illustrated solutions server include problem definitions and solutions related to securities trading.

Figure 14:
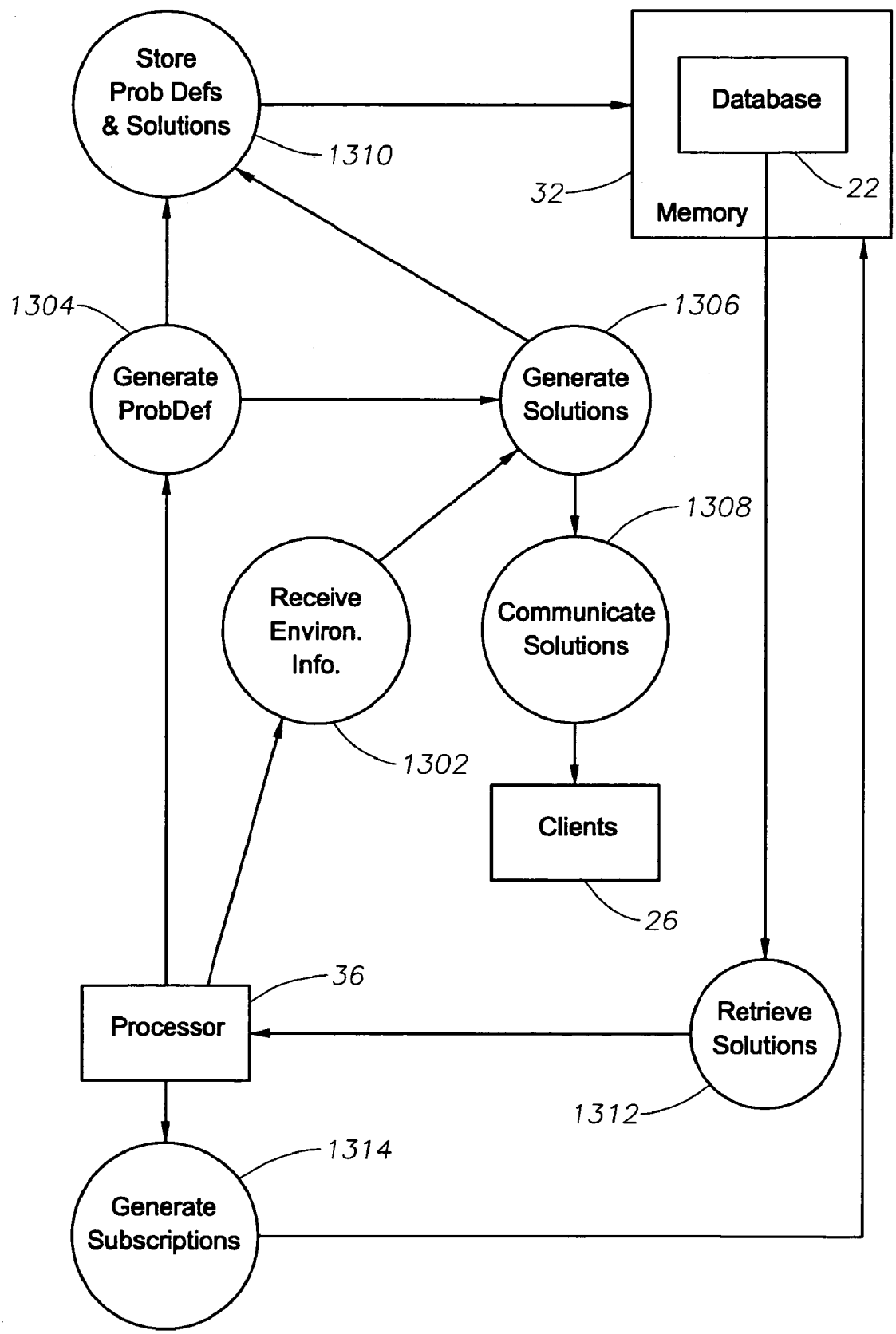
FIG. 14 is an example structural block diagram typical of certain embodiments.

A further embodiment of the solutions server of FIG. 14 includes computer memory (32) in which is stored (1310) problem definitions and solutions. Many embodiments of the solutions server implement computer memory storing problem definitions in the form of a database (22) with problem definitions records in a table (314) as shown in FIG. 2. An example of problem definitions records structured to address problems of securities trading is shown in FIG. 2G as including data elements of problem type (202), side (208), symbol (210), quantity (226). An example of solutions records structured to address problems of securities trading is shown in FIG. 2F as including data elements of problem type (202), symbol (210), side (208), quantity (220), price (222), and market identification (224).

A further embodiment illustrated at FIG. 14 provides a processor (36) further programmed to retrieve (1312) at least one solution record from the solutions records in the database (22). In many embodiments of the aspect of the invention illustrated in FIG. 14, at least one client (26) is a broker-dealer computer system programmed and operated to effect securities trading.

In many embodiments of the solutions server illustrated in FIGS. 12 and 14, problems are categorized according to type. An example of a data structure (314) defining a problem categorized according to problem type (202) is shown at FIG. 2G.

A further embodiment illustrated at FIG. 14 provides a processor (36) further programmed to generate subscriptions (1314) for solutions. In many embodiments of the kind illustrated, subscriptions comprise relations between clients (216) and types of problems (202) as shown in data structure (310) in FIG. 2D.

Figure 15:
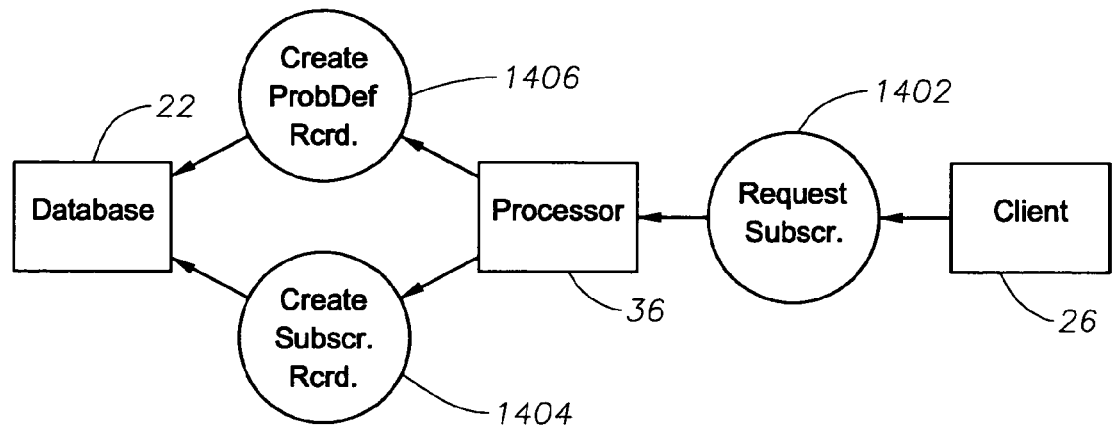
FIG. 15 is an example structural block diagram for subscription entry.

Turning to FIG. 15, additional embodiments of a solution server are seen. One embodiment shown in FIG. 15 provides for a client's (26) submitting to a processor (36) a request for a subscription (1402). Another embodiment shown on FIG. 15 provides the processor (36) programmed to create a subscription record (1404) in response to the submission (1402) of the request for a subscription. In some embodiments, for example, the subscription record (310) comprises data elements identifying a client (216) and a problem type (202) as shown on FIG. 2D.

Still another embodiment illustrated on FIG. 15 provides the processor (36) further programmed to create (1406) at least one problem definition record dependent upon problem definition rules. In some embodiments, for example, the problem definition record (314) comprises data elements identifying problem type (202), side (208), symbol (210), and quantity (226), as shown in FIG. 2G.

Figure 16:
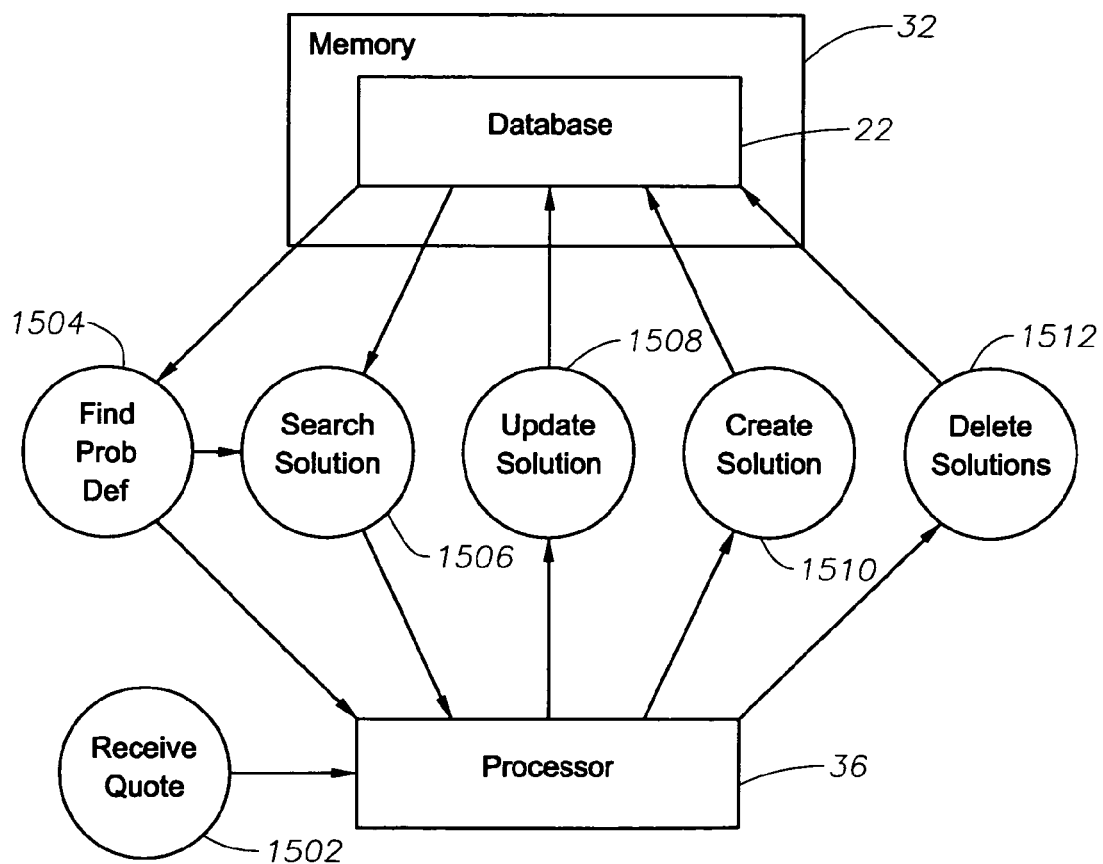
FIG. 16 is an example structural block diagram for solution generation.

Turning to FIG. 16, further embodiments of a solution server are seen. FIG. 16 illustrates an embodiment directed to securities trading in which environmental information comprises market information in the form of quotes received (1502) by a processor (36). An example of a data structure useful for this class of quotes (28), the quotes further comprising data elements identifying side (208), symbol (210), quantity (212), market (206), and a tag (214), is shown at FIG. 2C.

A further embodiment of the solutions server, shown in FIG. 16, provides the processor being further programmed to find (1504), when a quote is received (1502), a problem definition record having the same side and symbol as the quote. A further embodiment of the solutions server, shown in FIG. 16, provides the processor further programmed to search (1506) for a solution record having the same problem type, side, and symbol as the problem definition record having the same side and symbol as the quote and the same market as the quote. A still further embodiment of the solutions server, shown in FIG. 16, provides the processor being further programmed to update (1508), when the solution record is found, the solution record with the price from the quote.

A further embodiment of the solutions server, shown in FIG. 16, provides the processor further programmed to create a new solution record (1510), when the solution record is not found, having the same problem type, side, and symbol as the problem definition record having the same side and symbol as the quote, the same market as the quote, and the same price as the quote. A further embodiment of the solutions server, shown in FIG. 16, provides the processor further programmed to delete (1512) solution records having the same side, symbol, and market as the quote, when a quote is received and the quote tag indicates that the quote is closed.

Figure 17:
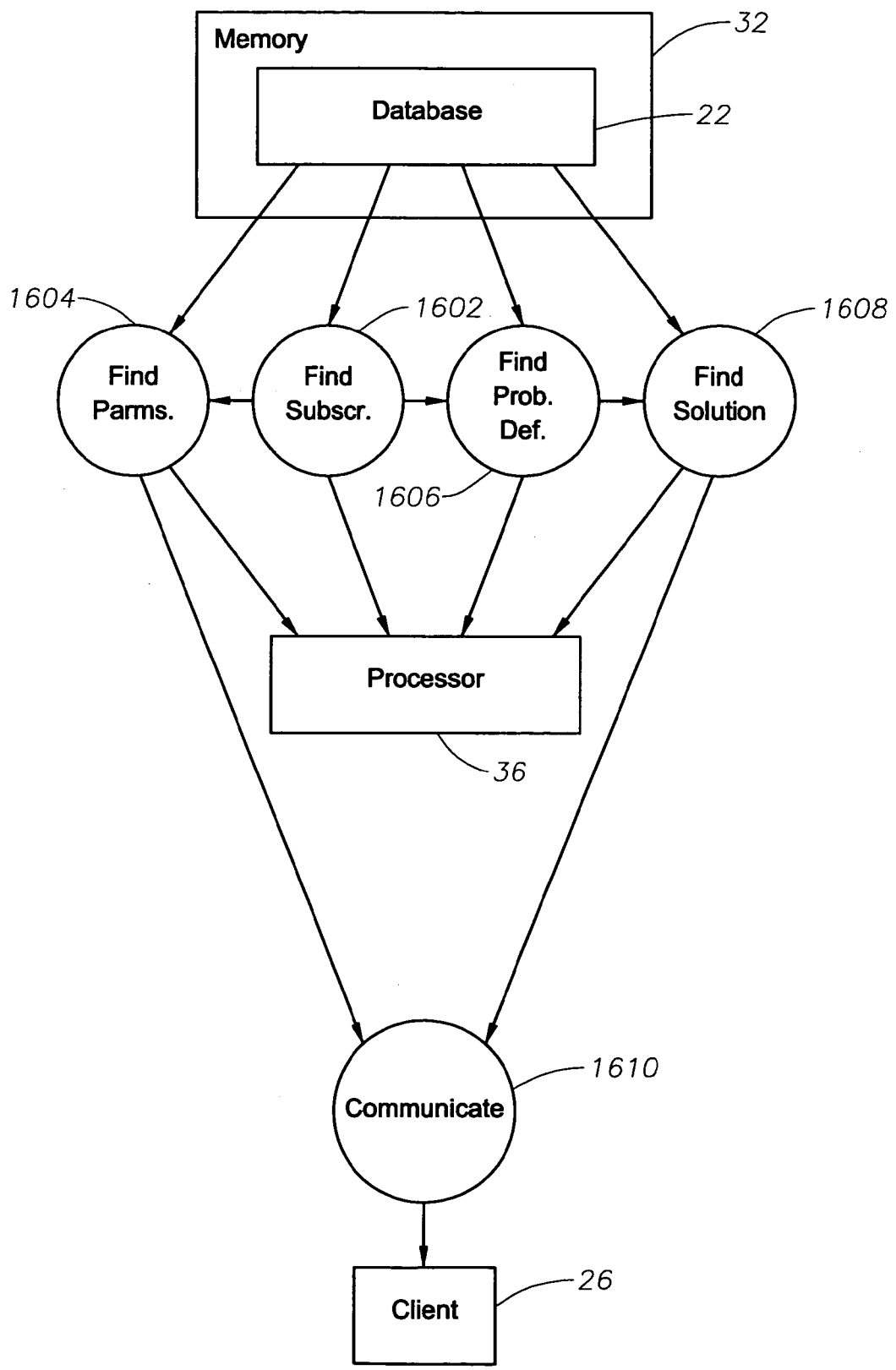
FIG. 17 is an example structural block diagram for solution retrieval and transmission.

Turning now to FIG. 17, additional embodiments of a solutions server are seen. One embodiment illustrated in FIG. 17 provides a processor programmed to repeatedly find (1602) a next subscription record so that each existing subscription record is found in turn.

A further embodiment shown in FIG. 17 provides the processor further programmed to find (1604), at least one subscription record is found, for each found subscription record, a related record of data communications parameters for the client identified in the found subscription record. A further embodiment shown in FIG. 17 provides the processor further programmed to find (1606), for each found subscription record, at least one related problem definition record.

A still further embodiment shown in FIG. 17 provides the processor further programmed to find (1608), when at least one problem definition record is found, for each found problem definition record, at least one related solution record. A further embodiment shown in FIG. 17 provides the processor further programmed to communicate (1610), dependent upon data communication parameters identified in a found record of data communications parameters, to the client identified in the found subscription record at least one data element of a found solution record.

Figure 18:
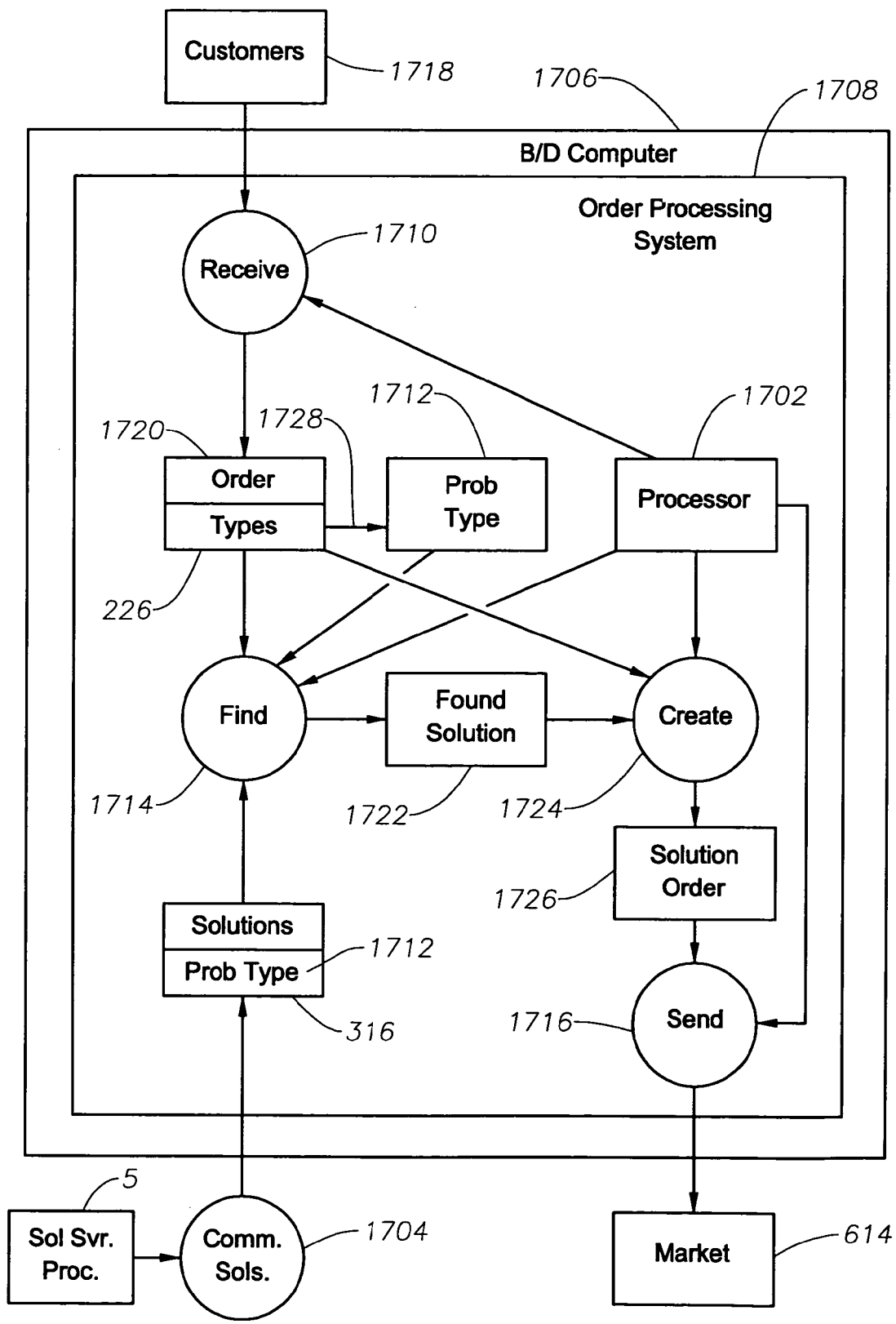
FIG. 18 is an example structural block diagram for order execution.

Turning to FIG. 18, further embodiments of the invention are seen. One embodiment illustrated in FIG. 18 provides a solutions server processor (5) is programmed to communicate solutions (1704) to clients, the processor (5) programmed to communicate (1704) solutions (316) to at least one order processing system (1708) on a broker-dealer computer (1706), the broker-dealer computer (1706) further comprising a broker-dealer processor (1702).

Figure 13:
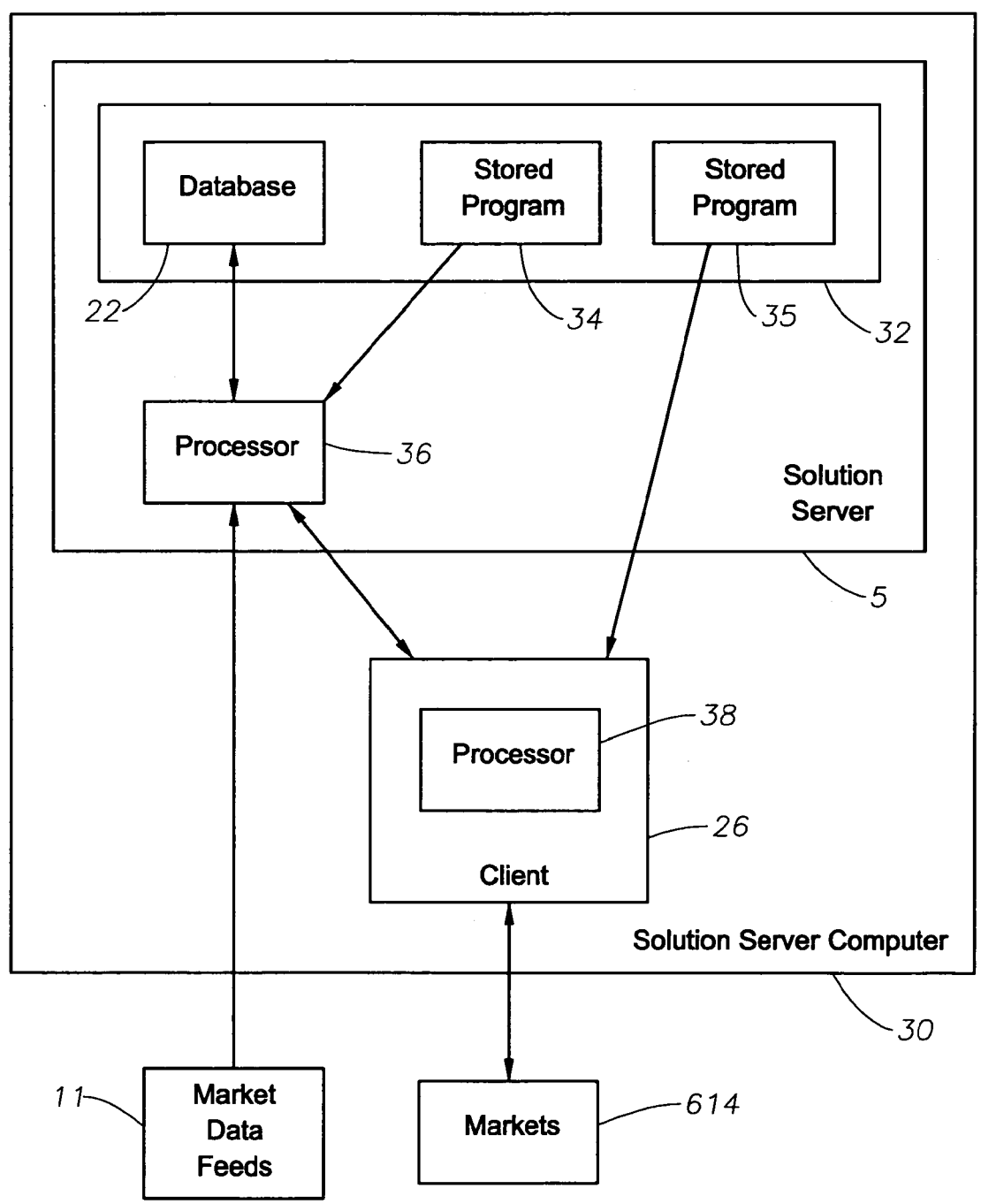
FIG. 13 is an example structural block diagram typical of certain embodiments.

A further embodiment shown in FIG. 18 provides the broker-dealer processor (1702) programmed to receive (1710) at least one customer order (1720). In some embodiments the order processing system is the client (26) as shown on FIG. 12. In embodiments of the kind shown in FIG. 12, the client order processing system is installed and operated on a computer (28) separate from the computer (30) on which the solution server (5) is installed. In other embodiments, as shown in FIG. 13, the client order processing system (26) is installed and operated on the same computer (30) with the solution server (5). All these embodiments, as well as other configurations of solution server and client installation and operation, are well within the scope of the present invention.

In some embodiments, the customer order (606) comprises data elements identifying symbol (210), quantity (228), and optionally, price (230), market (224), and order type (226), as shown in FIG. 2H. Other embodiments use other data structures for orders, all structures for order being well within the scope of the present invention.

In many embodiments, the customer order type (226) has a relation (as shown, for example, at reference number 1728 on FIG. 18) to a problem type (1712), including, for example, a one-to-one correspondence. All relations between order type and problem type are within the scope of the present invention.

A still further embodiment shown in FIG. 18 provides the broker-dealer processor (1702) further programmed to find (1714) at least one solution record (1722) dependent upon the received customer order and, in many embodiments, also dependent upon the problem type (1712).

A still further embodiment shown in FIG. 18 provides the broker-dealer processor (1702) further programmed to create (1724) and send (1716) to at least one market (614) at least one solution order (1726) dependent upon the customer order (1720) and the found solution record (1722). Solution orders (1726) in many embodiments have structures dictated by the markets to which the solution orders are directed, although in many embodiments, the structure of solution orders is similar to the structure of the customer order as shown in FIG. 2H. All data structures useful for solutions orders sent to markets are well within the invention. Typical embodiments of the kind illustrated in FIG. 18 provide the broker-dealer processor (1702) programmed to send (1716) to at least one market (614) at least one solution order (1726), the solution order comprising the side, symbol, quantity, price, and market data elements from the found solution record.

Figure 19:
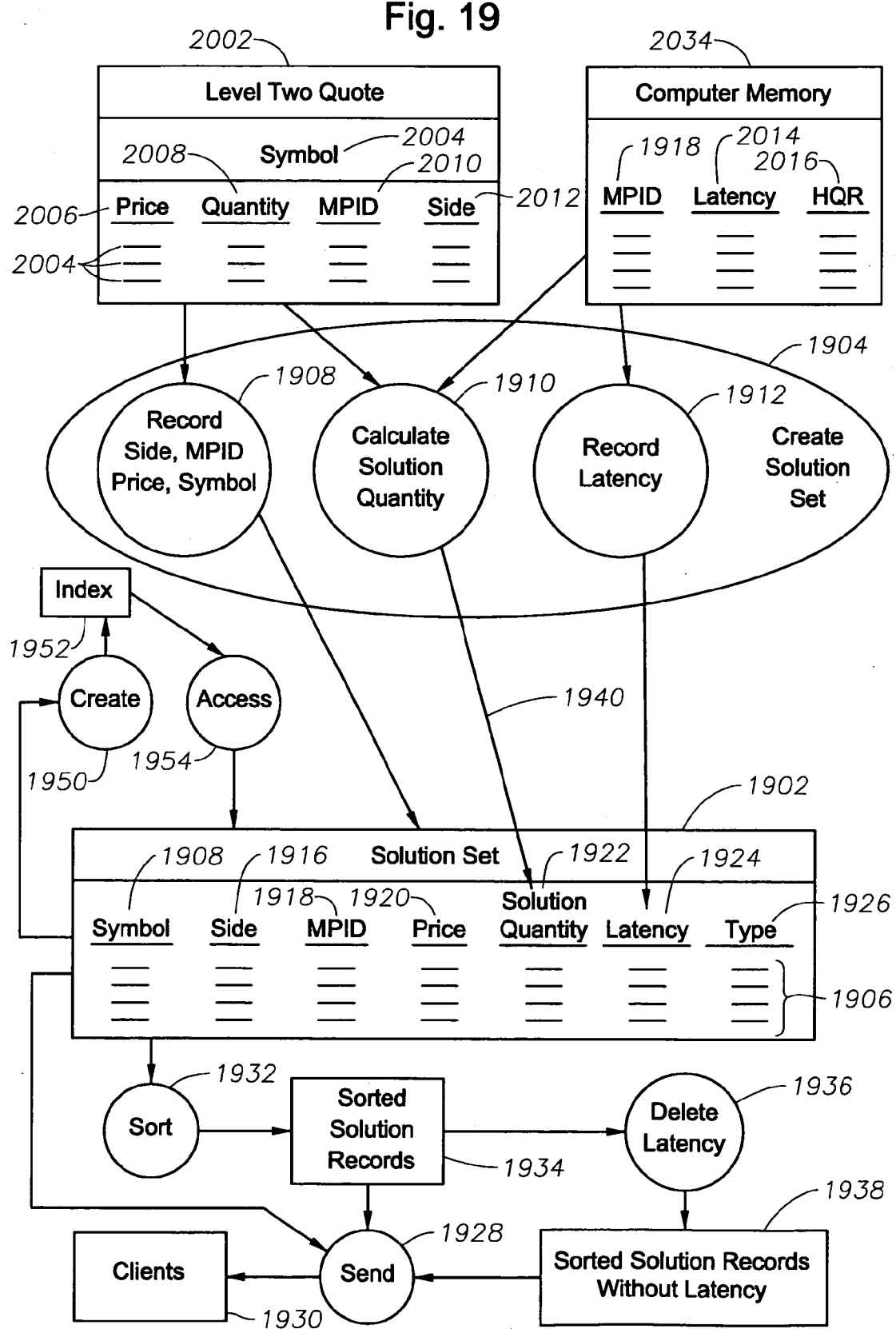
FIG. 19 illustrates methods of providing solutions for trading securities

Turning now to FIG. 19, a further aspect of the invention is seen, that is, a method of providing solutions for trading securities. One embodiment illustrated at FIG. 19 includes receiving a level-two quote (2002), the level-two quote comprising a symbol (2010) and at least one market participant quote (2004), the market participant quote further comprising a quote price (2006), a quote quantity (2008), a quote MPID (2012), and a quote side (2012). The illustrated embodiment includes creating (1904) in computer memory a solution set (1902) comprising at least one solution record (1906) corresponding to each market participant quote (2004) in the level-two quote (2002), the solution record (1906) comprising a solution symbol (1908), a solution side (1.916), a solution MPID (1918), a solution price (1920), a solution quantity (1922), and a solution latency (1924), the solution latency comprising a latency for the market identified by the solution MPID (1918). A further embodiment shown also in FIG. 19 includes sending (1928) the solution set to at least one client (1930).

It is worth noting that embodiments of the kind illustrated in FIG. 19 do not include problem definitions in the form of data structures stored in computer memory or in records or tables in databases. In such embodiments, problem definitions typically take, for example, forms such as "Buy MSFT" or "Sell GMC," that is, a side combined with a symbol. In embodiments using such problem definitions, problem definitions comprising merely a side and a symbol, the software programs stored in memory and controlling a processor can be designed to infer problem definitions with no need for separate storage of problem definitions. In such embodiments, specific problem definitions are inferred under program control from the client's presentation of the problem. For example, in the case of securities trading, a customer order includes a side and a symbol. If the order side is "bid" and the order symbol is "MSFT," then the problem definition is inferred to be "Buy MSFT." The client software in such embodiments proceeds directly to a search of the solutions records based on merely those two fields, side and symbol, to find solutions to the problem of "Buy MSFT."

Figure 21:
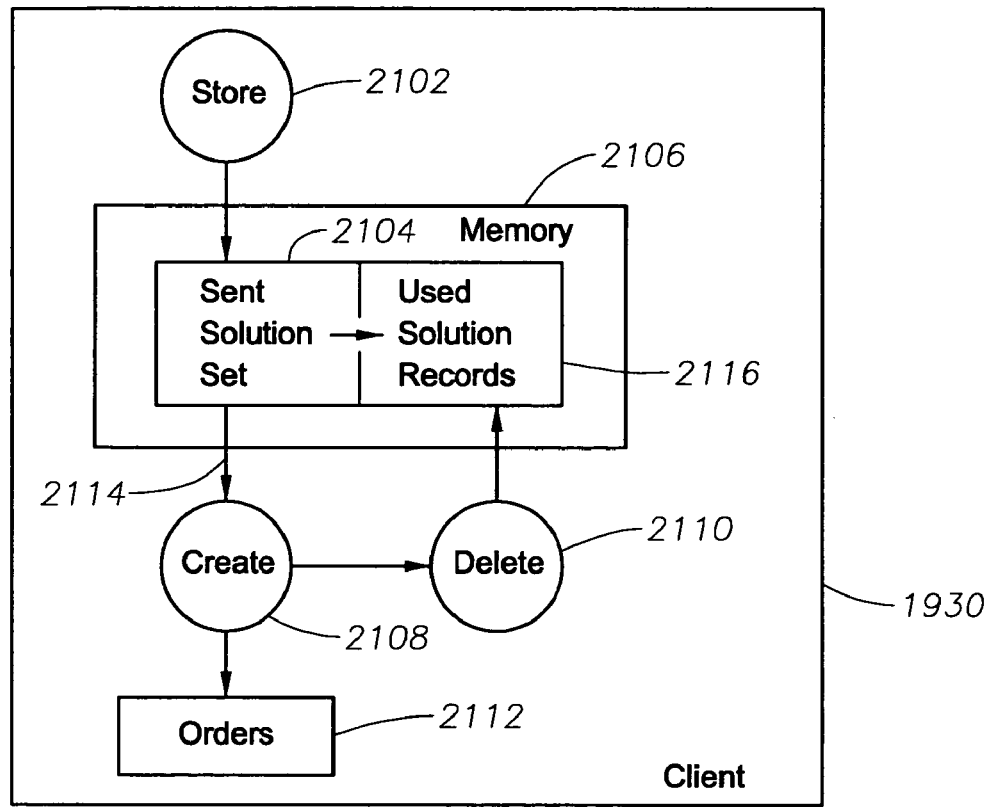
FIG. 21 illustrates an example structure of a client.

In a further embodiment, as shown in FIG. 21, the client (1930) comprises an automated system for trading securities, and the embodiment includes storing (2102) the sent solution set (2104) in computer memory (2106) in the client system (1930). The embodiment illustrated in FIG. 21 also provides for using (2114) at least one of the sent solution records (2104) to create (2108) orders (2112) for securities. The embodiment of FIG. 21 also includes deleting (2110) from computer memory the used solution records (2116).

Figure 22:
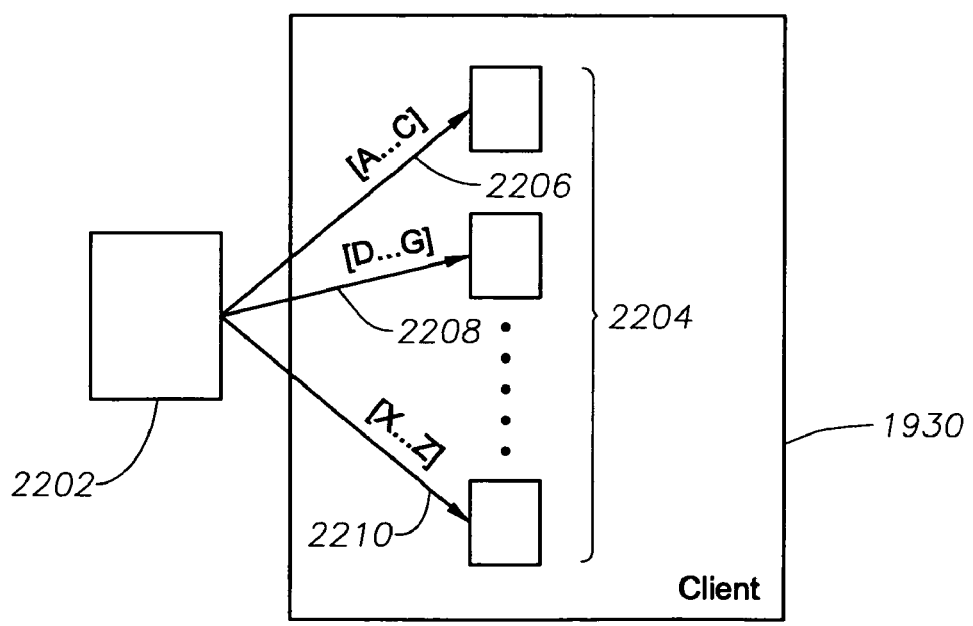
FIG. 22 illustrates scaling of a client system.

In a further embodiment, shown in FIG. 22, the client (1930) comprises more than one automated system (2204) for trading securities and the automated systems for trading securities are scaled. "Scaled" means that solutions provided to clients are apportioned for efficiency among more than one client computer system. In the embodiment shown in FIG. 22, for example, solutions for symbols beginning with the letters of the alphabet between "A" and "C" are sent to a first client system (2206), and solutions for symbols beginning with letters in other ranges are apportioned among other client systems (2208, 2210).

In a further embodiment, referring again to FIG. 19, creating (1904) a solution set is seen to further comprise recording (1908) in the solution record (1906) the solution side (1916) derived from the quote side (2012), the solution MPID (1918) derived from the quote MPID (2010), the solution price (1920) derived from the quote price (2000), and the solution symbol (1908) derived from the symbol (2010) in the level-two quote (2002). In a still further embodiment, also shown in FIG. 19, creating (1904) a solution set includes calculating (1910) the solution quantity (1922) for the solution record (1906) dependent upon the quote quantity (2008) and dependent upon a hidden quantity ratio (2016) for the market identified by the solution MPID (1918). This example embodiment also provides for recording (1940) the solution quantity (1922) in the solution record (1906).

Figure 23:
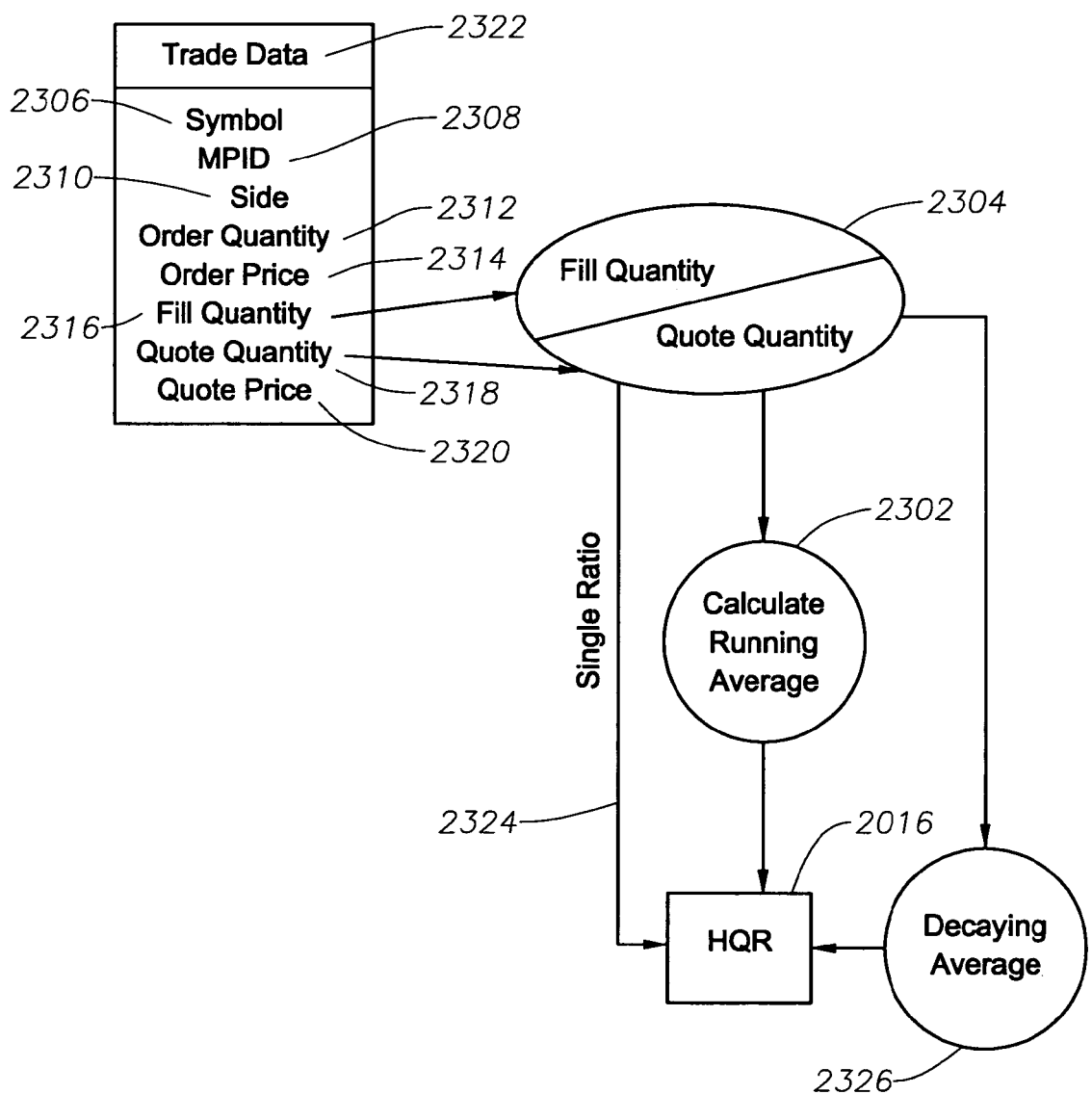
FIG. 23 illustrates example derivations of hidden quantity ratio.

In a further embodiment of the invention, illustrated at FIG. 23, the hidden quantity ratio (2016) comprises a running average (2302) of the ratios (2304) of order fill quantity (2316) to quote quantity, the order fill quantity and the quote quantity being derived from trade data (2322) comprising descriptions of executions of orders for securities. In a further embodiment of the invention, illustrated at FIG. 23, the hidden quantity ratio (2016) comprises a decaying average (2326) of the ratios (2304) of order fill quantity (2316) to quote quantity, the order fill quantity and the quote quantity being derived from trade data (2322) comprising descriptions of executions of orders for securities. In a still further embodiment of the invention, illustrated at FIG. 23, the hidden quantity ratio (2016) comprises a single (2324) ratio (2304) of an order fill quantity to a quote quantity, the order fill quantity and the quote quantity being derived from trade data comprising descriptions of executions of orders for securities.

In a further embodiment, illustrated also in FIG. 19, the solution set comprises at least two solution records, and the illustrated embodiment includes sorting (1932) the solution records (1906) to yield sorted solution records (1934). Some embodiments sort according to side. Other embodiments sort according to price, latency, price and latency, or side and price and latency. Still other embodiments utilize other sorting principles, all sorting arrangement being well within the scope of the invention.

A further embodiment, shown also in FIG. 19, provides for deleting (1936) solution latency from the sorted solution records (1934). A further embodiment, also shown on FIG. 19, include creating (1950) an index (1952) for use in accessing (1954) solution records (1906) in the solution set (1902). Some embodiments index according to side. Other embodiments index according to price, latency, price and latency, or side and price and latency. All forms of index are well within the scope of the invention. In a further embodiment of the invention, as shown in FIG. 19, the solution record (1906) further comprises a type code (1926).

Figure 20:
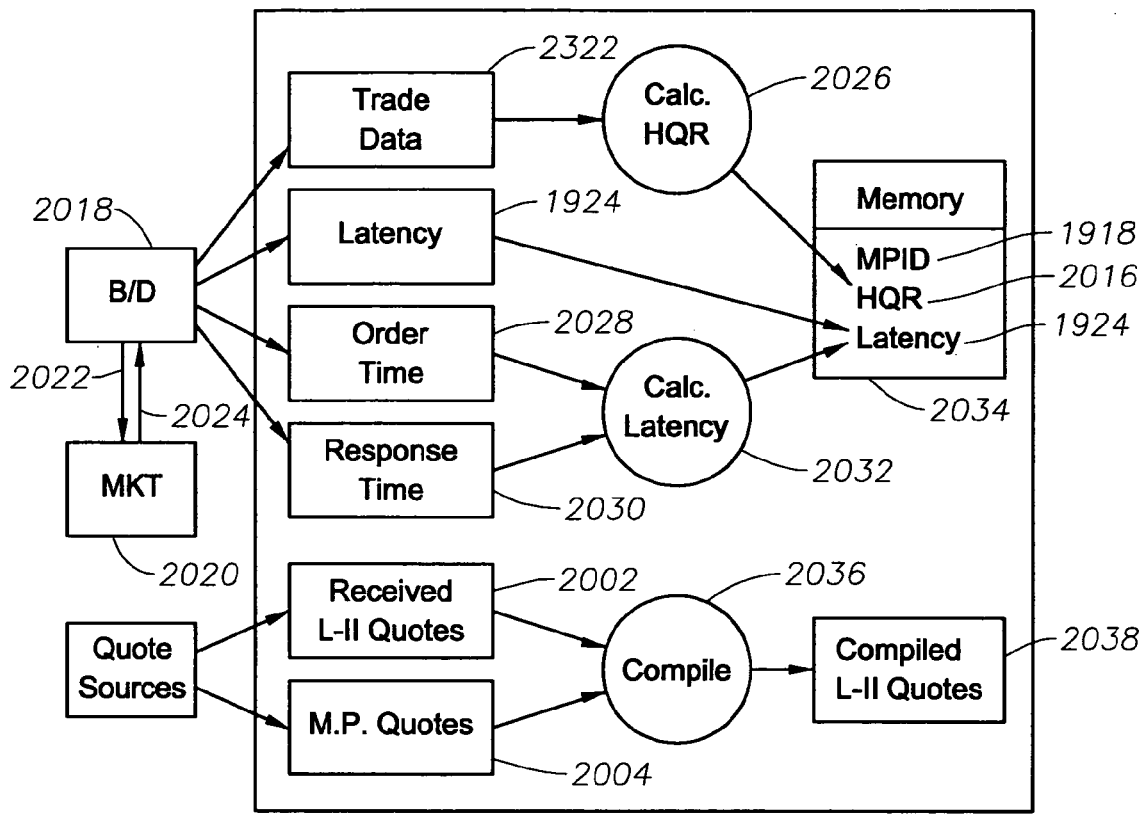
FIG. 20A shows additional embodiments of methods of providing solutions for trading securities.
FIG. 20B shows an example data structure for a level-two quote.

In a still further embodiment of the invention, as shown in FIG. 20A, latency (2014) comprises the difference between the time when a broker-dealer (2018) receives (2024) from a market (2020) a response to an order and the time when the order was sent (2022) to the market. Other embodiments measure latency according to the time for the order to travel from the broker-dealer to the market. Other embodiments measure latency according to the fill time within the market. All measures of latency as used in various embodiments are well within the scope of the invention.

Figure 24:
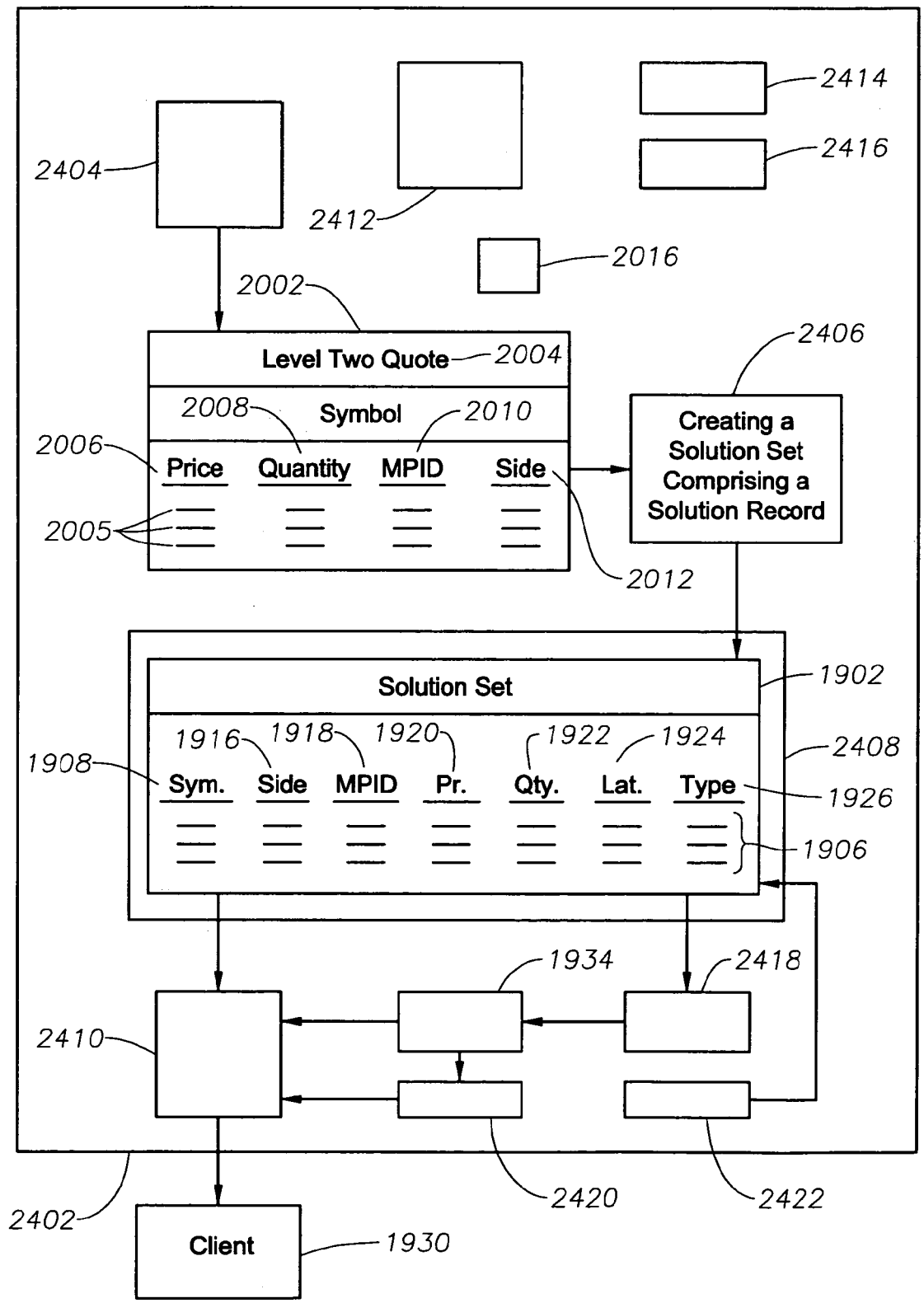
FIG. 24 illustrates embodiments of systems for generating solutions for trading securities.

Turning now to FIG. 24, a further aspect of the invention is seen, that is, a system for generating solutions for trading securities. In one embodiment, shown in FIG. 24, a system (2402) for generating solutions for trading securities includes means for receiving (2402) a level-two quote (2002), the level-two quote comprising a symbol and at least one market participant quote (2005), the market participant quote further comprising a quote price (2006), a quote quantity (2008), a quote MPID (2010), and a quote side (2012). Means for receiving a level-two quote includes Nasdaq feeds and subscriber feeds from ECNs received across networks or dedicated lines through communications ports operated under program control in a computer system. Other sources of feeds for level-two quotes are within the scope of the invention, including dedicated communications hardware which in some cases is supplied by the sources of quotes for the purpose of communicating quotes, including, for example, Nasdaq's "Service Delivery Platform" or "SDP."

The embodiment illustrated in FIG. 24 includes also means for creating (2406) in computer memory (2408) a solution set (1902) comprising at least one solution record (1906) corresponding to each market participant quote (2005) in the level-two quote (2002), the solution record (1906) comprising a solution symbol (1908), a solution side (1916), a solution MPID (1918), a solution price (1920), a solution quantity (1922), and a solution latency (1924), the solution latency comprising a latency for a market identified by the solution MPID (1918). Means for creating a solution set in computer memory, in most embodiments, is a computer processor coupled to computer memory and operating under control of a program stored in computer memory. Forms of computer memory operable within the invention include random access memory, read-only memory, programmable read-only memory, erasable programmable read-only memory, other forms of semiconductor memory, as well as various forms of magnetic storage such as computer disk drives.

The embodiment illustrated in FIG. 24 also includes means for sending (2410) the solution set to at least one client (1930). Means for sending the solution in such embodiments includes data communications ports, networks, satellite links, dedicated phone lines, intranets, internets, extranets, and other forms of networks, coupling the embodiment of the invention to at least one client.

Figure 25:
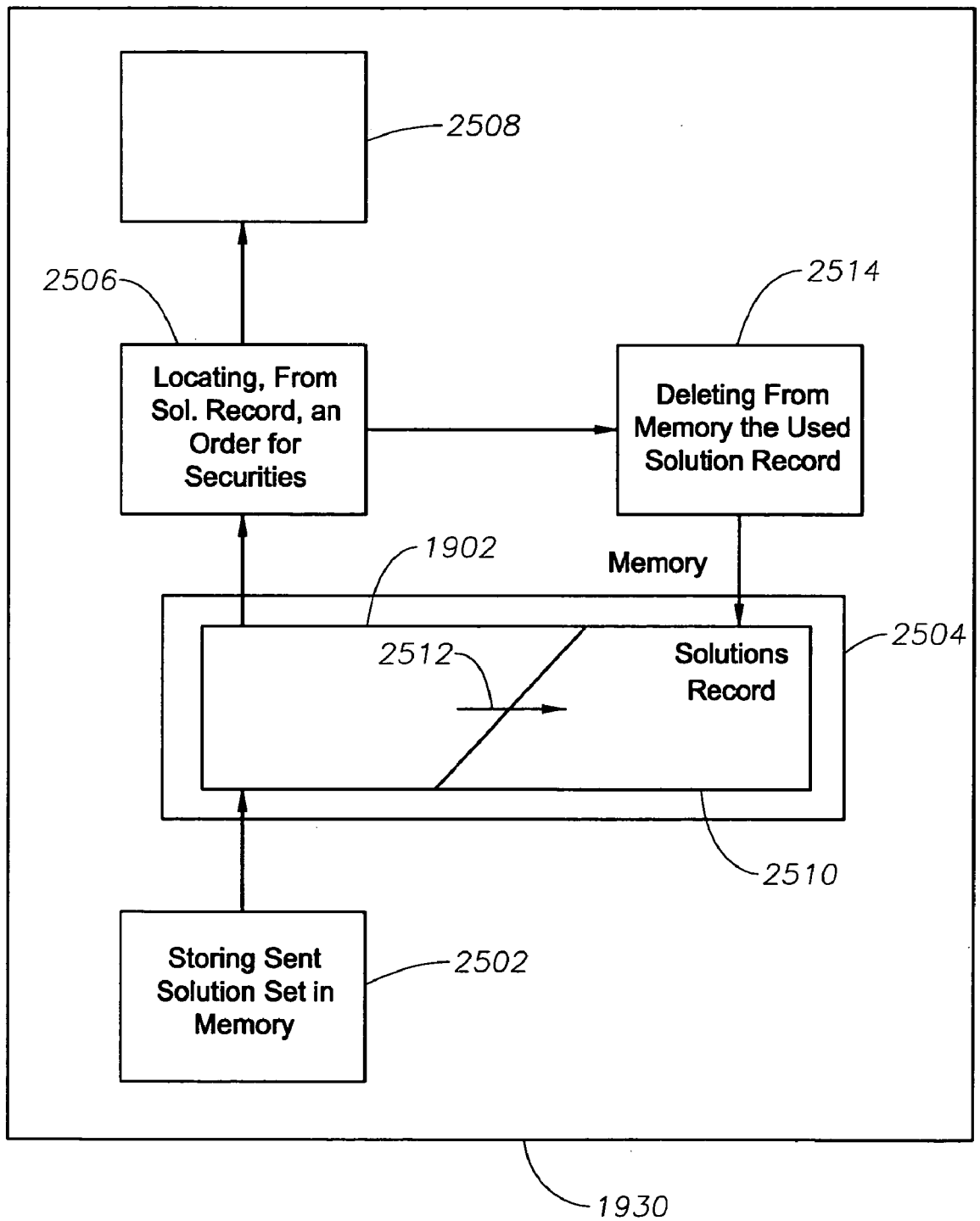
FIG. 25 illustrates further embodiments of systems for generating solutions for trading securities.

In a further embodiment, shown in FIG. 25, the client (1930) comprises an automated system for trading securities that includes means for storing (2502) the sent solution set (1902) in computer memory (2504) in the client (1930). Means for storing a solution set in computer memory, in most embodiments, is a computer processor coupled to computer memory and operating under control of a program stored in computer memory. Forms of computer memory operable within the invention include random access memory, read-only memory, programmable read-only memory, erasable programmable read-only memory, other forms of semiconductor memory, as well as various forms of magnetic storage such as computer disk drives.

The embodiment illustrated in FIG. 25 includes also means for creating (2506), from at least one of the sent solution records (1902), an order (2508) for securities, wherein creating an order from the sent solution record (1902) further comprises creating (2512) a used solution record (2510). Means for creating an order, in most embodiments, is a computer processor coupled to computer memory and operating under control of a program stored in computer memory.

The embodiment illustrated in FIG. 25 also provides means for deleting (2514) from computer memory (2504) the used solution record (2510). Means for deleting the used record, in most embodiments, is a computer processor coupled to computer memory and operating under control of a program stored in computer memory. Forms of computer memory operable within the invention include random access memory, read-only memory, programmable read-only memory, erasable programmable read-only memory, other forms of semiconductor memory, as well as various forms of magnetic storage such as computer disk drives.

In a further embodiment, as shown in FIG. 22, the client (1930) includes more than one automated system (2204) for trading securities and the automated systems (2204) for trading securities are scaled. "Scaled" means that solutions provided to clients are apportioned for efficiency among more than one client computer system. In the embodiment shown in FIG. 22, for example, solutions for symbols beginning with the letters of the alphabet between "A" and "C" are sent to a first client system (2206), and solutions for symbols beginning with letters in other ranges are apportioned among other client systems (2208, 2210).

Figure 29:
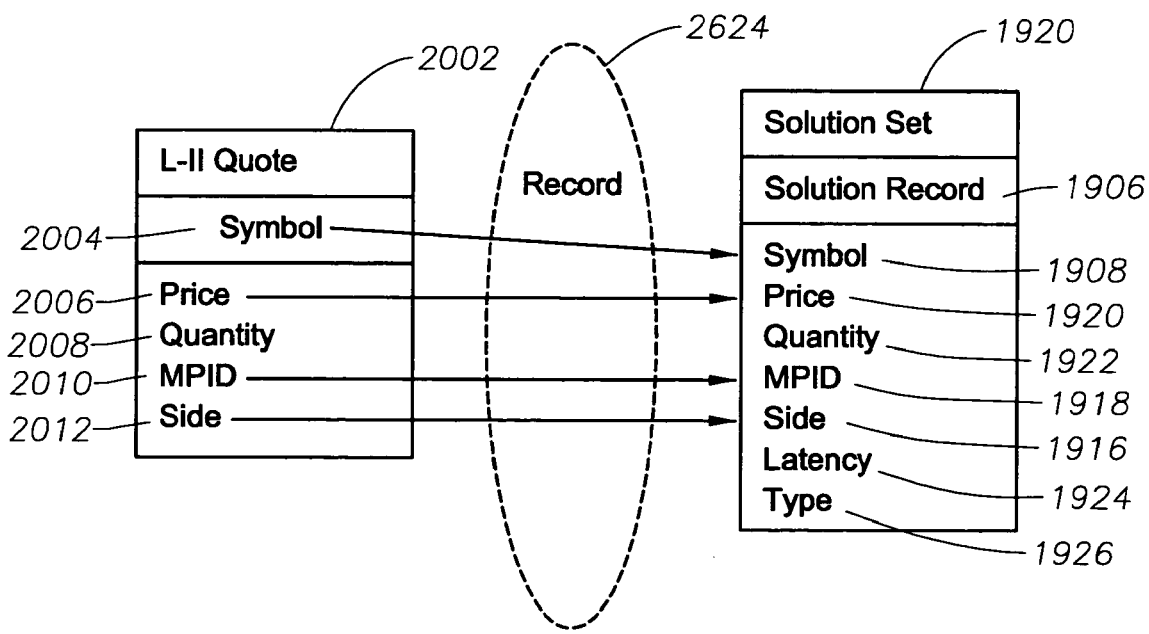
FIG. 29 illustrates creation of a solution set dependent upon a level-two quote.

In a further embodiment, shown in FIG. 24, means for creating a solution set includes means for recording (2412) in the solution record, as shown in more detail in FIG. 29, the solution side (1916) derived from the quote side (2012), the solution MPID (1918) derived from the quote MPID (2010), the solution price (1920) derived from the quote price (2006), and the solution symbol (1908) derived from the symbol (2004) in the level-two quote. Means for recording in the solution record, in most embodiments, is a computer processor coupled to computer memory and operating under control of a program stored in computer memory.

In a further embodiment of the invention illustrated in FIG. 24 the means for creating a solution set includes means for calculating (2414) the solution quantity for the solution record dependent upon the quote quantity and dependent upon a hidden quantity ratio for the market identified by the solution MPID. Means for calculating the solution quantity, in most embodiments, is a computer processor coupled to computer memory and operating under control of a program stored in computer memory.

In the embodiment illustrated in FIG. 24, the means for creating a solution set includes means for recording (2416) the solution quantity in the solution record. Means for calculating the solution quantity and means for recording the solution quantity, in most embodiments, are a computer processor coupled to computer memory and operating under control of a program stored in computer memory.

In a further embodiment of the invention, as shown in FIG. 23, the hidden quantity ratio (2016) comprises a running average (2302) of the ratios (2304) of order fill quantity (2316) to quote quantity (2318), the order fill quantity and the quote quantity being derived from trade data (2322) comprising descriptions of executions of orders for securities. In a still further embodiment of the invention, also shown in FIG. 23, the hidden quantity ratio (2016) comprises a single (2324) ratio (2304) of an order fill quantity (2316) to a quote quantity (2318), the order fill quantity and the quote quantity being derived from trade data (2322) comprising descriptions of executions of orders for securities. In a further embodiment of the invention, also illustrated at FIG. 23, the hidden quantity ratio (2016) comprises a decaying average (2326) of the ratios (2304) of order fill quantity (2316) to quote quantity, the order fill quantity and the quote quantity being derived from trade data (2322) comprising descriptions of executions of orders for securities.

In a further embodiment of the invention, as shown in FIG. 24, the solution set (1902) includes at least two solution records (1906), and the embodiment further includes means for sorting (2418) the solution records to yield sorted solution records (1934). A further embodiment, as shown in FIG. 24, includes means for sorting the solution records according to side. Other embodiments includes means for sorting the solution records according to price, latency, price and latency, side and price and latency. Other embodiments sort according to other fields or combinations of fields within the solution records. All sorting arrangements of the solution records, in various alternative embodiments, are well within the scope of the invention. Means for sorting solution records, in most embodiments, is a computer processor coupled to computer memory and operating under control of a program stored in computer memory.

A further embodiment, also shown in FIG. 24, provides means for deleting (2420) solution latency from the sorted solution records (1934). Means for deleting in most embodiments is at least one computer processor operating under control of a program stored in computer memory.

A further embodiment, also shown in FIG. 24, includes means for creating (2422) an index for the solution set. Means for creating an index in most embodiments is at least one computer processor operating under program control to read index fields from the solution records and create a new set of ordered index records in computer memory dependent upon the read fields. Indexes so created are ordered according to side, price, latency, price and latency, side and price and latency, and other ordering principles, all of which in various alternative embodiments are well within the scope of the invention.

In a further embodiment of the invention, shown in FIG. 24, the solution record (1906) includes a type code (1926). In many embodiments, the type code (1926) is used to select among computer program subroutines to vary the function of the invention to provide solutions optimizing speed of order execution, solutions optimizing price, solutions optimizing quantities of securities traded, and solutions optimizing other parameters of performance. Many different solution types are effected by use of various sorting principles applied to solution records in computer memory. All such different solution types are well within the scope of the invention.

In a further embodiment of the invention, shown in FIG. 20A, solution latency (1924) comprises the difference between the time (2018) when a broker-dealer (2024) receives from a market (2020) a response to an order and the time when the order was sent (2022) to the market (2020). Other embodiments measure latency according to the time for the order to travel from the broker-dealer to the market. Other embodiments measure latency according to the fill time within the market. All measures of latency as used in various embodiments are well within the scope of the invention.

Figure 26:
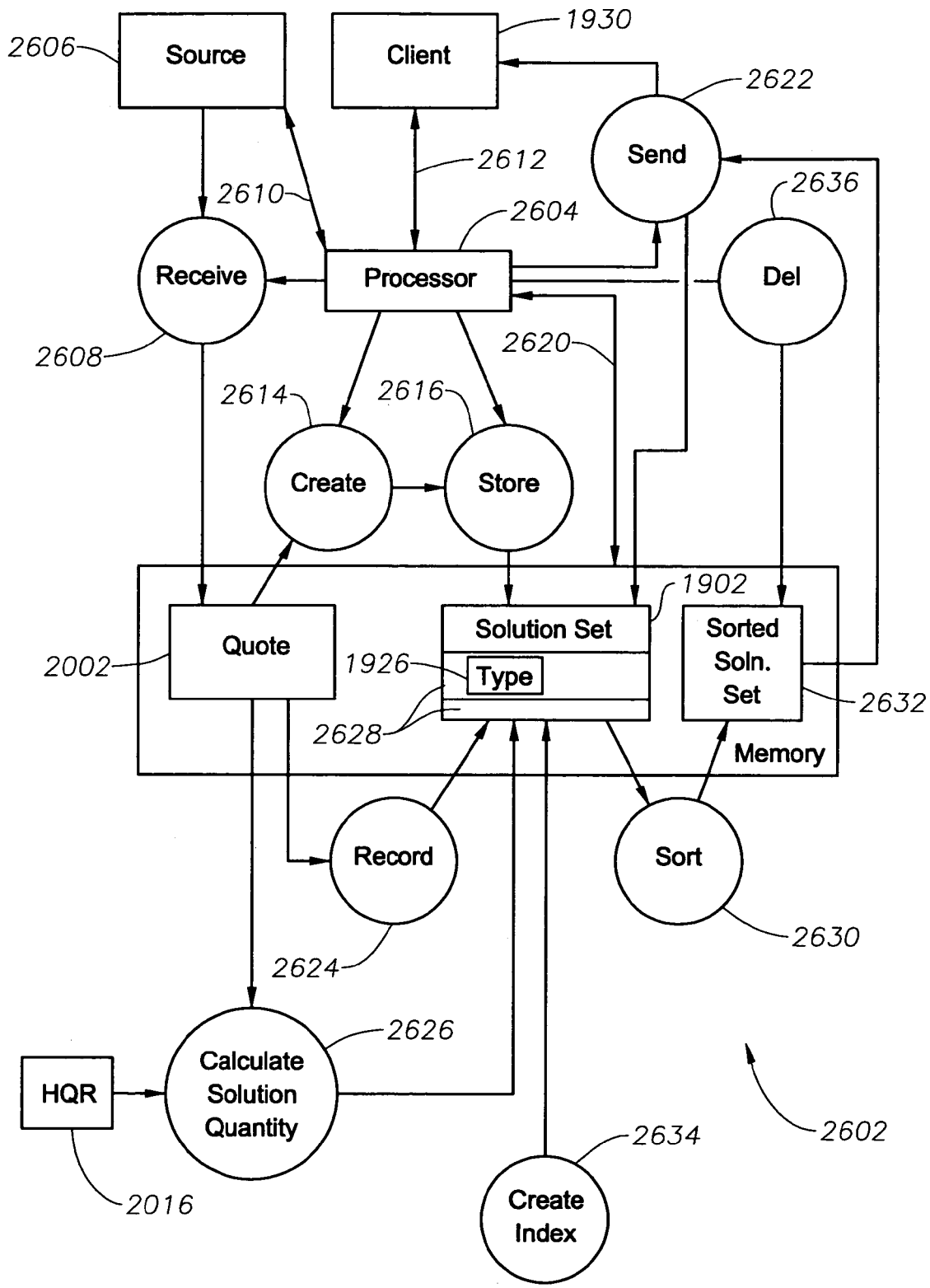
FIG. 26 illustrates further embodiments of systems for generating solutions for trading securities.

Turning now to FIG. 26, a further aspect of the invention is seen as a system (2602) for providing solutions for trading securities. One embodiment, illustrated in FIG. 26, provides a processor (2604) coupled (2610) to at least one source of quotes (2606) and coupled (2612) to at least one client (1930), the processor (2604) programmed to receive (2608) at least one level-two quote (2002), the level-two quote (2002) comprising a symbol and at least one market participant quote (2004), the market participant quote comprising a quote price (2006), a quote quantity (2008), a quote MPID (2010), and a quote side (2012).

A further embodiment illustrated in FIG. 26 includes the processor programmed to create (2614) a solution set (1902) comprising at least one solution record (1906) corresponding to each market participant quote (2004), the solution record comprising a solution symbol (1908), a solution side (1906), a solution MPID (1918), a solution price (1920), a solution quantity (1922), and a solution latency (1924), the solution latency comprising a latency for the market identified by the solution MPID (1918). The embodiment illustrated in FIG. 26 includes also a memory (2618) coupled (2620) to the processor (2604) with the processor programmed to store (2616) the solution set (1902) in the memory (2618).

A further embodiment illustrated in FIG. 26 includes the processor the processor (2604) is programmed to send (2622) the solution set (1902) to the client (1930).

Figure 27:
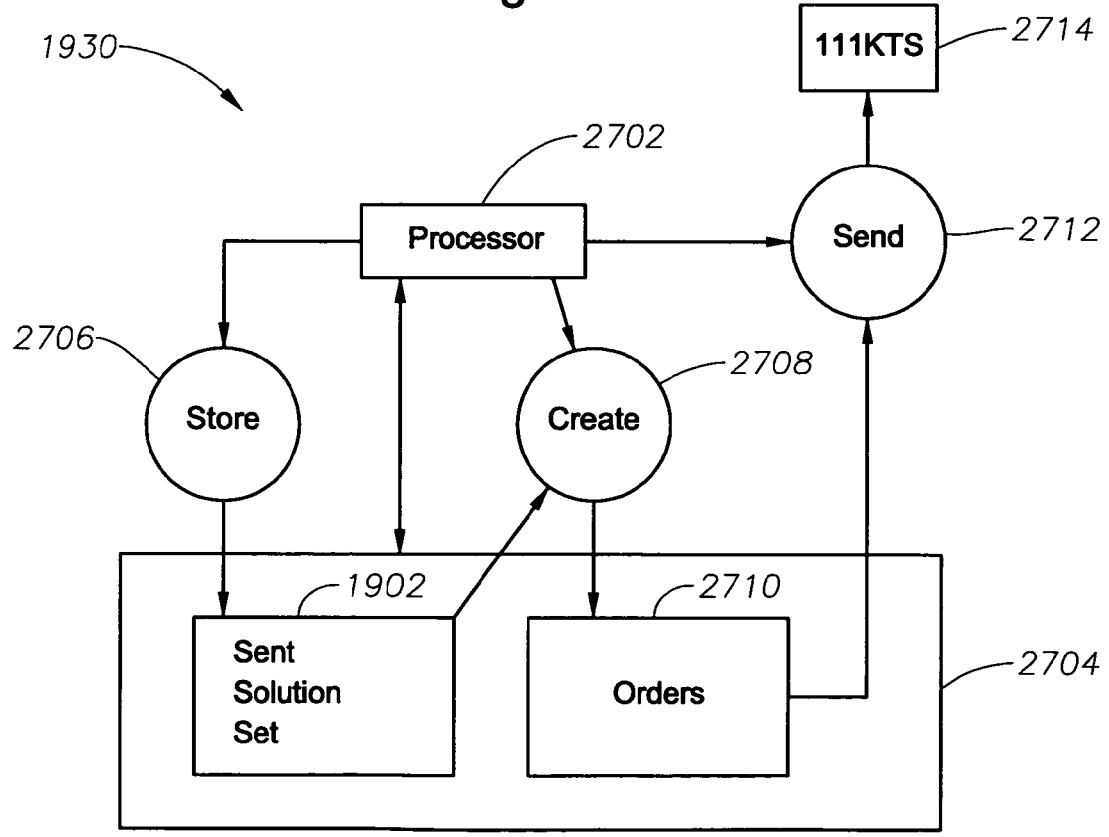
FIG. 27 illustrates an example of structure of a client.

In a further embodiment, shown in FIG. 27, the client (1930) comprises an automated system for trading securities, the system further comprising a client processor (2702) coupled to client memory (2704). In the embodiment shown in FIG. 27, the client processor is programmed to store (2706) the sent solution set (1902) in client memory (2704), create (2708), dependent upon the sent solution set (1902), orders (2710) for securities, and send (2712) the orders for securities to markets (2714).

Figure 28:
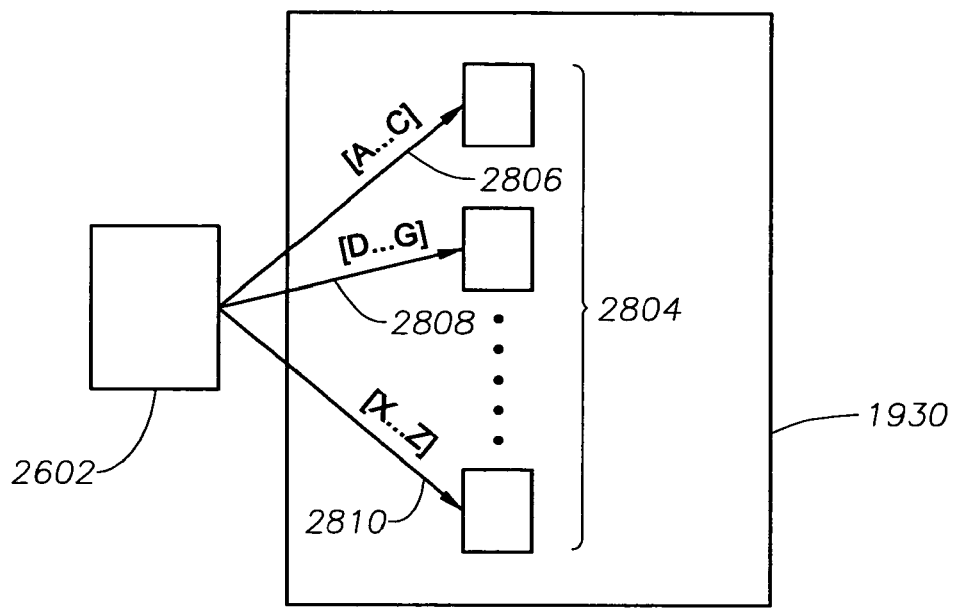
FIG. 28 illustrates an example of scaling of a client.

In a further embodiment, shown in FIG. 28, the client (1930) comprises more than one automated system (2804) for trading securities, and the automated systems for trading securities are scaled (2806, 2808, 2810). "Scaled" means that solutions provided to clients are apportioned for efficiency among more than one client computer system. In the embodiment shown in FIG. 28, for example, solutions for symbols beginning with the letters of the alphabet between "A" and "C" are sent to a first client system (2806), and solutions for symbols beginning with letters in other ranges are apportioned among other client systems (2808, 2810).

In a further embodiment, shown in FIG. 26, the computer processor is programmed also to record (2624) in the solution set (1902), as shown in more detail in FIG. 29, the solution side (1916) derived from the quote side (2012), the solution MPID (1918) derived from the quote MPID (2010), the solution price (1920) derived from the quote price (2006), and the solution symbol (1908) derived from the symbol (2004) in the level-two quote. In a further embodiment, as shown in FIG. 26, the processor is further programmed to calculate (2626) the solution quantity dependent upon the quote and dependent upon a hidden quantity ratio (2628). The processor in this embodiment is programmed also to record (2624) the solution quantity in the solution record (2628).

In a further embodiment, illustrated in FIG. 23, the hidden quantity ratio (2016) comprises a running average (2302) of the ratios (2304) of order fill quantity (2316) to quote quantity (2318), the order fill quantity and the quote quantity being derived from trade data (2322) comprising descriptions of executions of orders for securities having structure shown at 2322 in FIG. 23. In a still further embodiment, also illustrated in FIG. 23, the hidden quantity ratio (2016) comprises a single (2324) ratio (2304) of an order fill quantity (2316) to a quote quantity (2318), the order fill quantity and the quote quantity being derived from trade data (2322) comprising descriptions of executions of orders for securities. In a further embodiment of the invention, also illustrated at FIG. 23, the hidden quantity ratio (2016) comprises a decaying average (2326) of the ratios (2304) of order fill quantity (2316) to quote quantity, the order fill quantity and the quote quantity being derived from trade data (2322) comprising descriptions of executions of orders for securities.

In a further embodiment, shown in FIG. 26, the solution set includes at least two solution (2628) records, the processor (2604) being further programmed to sort (2630) the solution records (2628) to yield a sorted solution set (2632). In a further embodiment, also shown in FIG. 26, the processor is further programmed to sort the solution records according to side. In other embodiments, the processor is programmed to sort the solution records according to price, latency, price and latency, or side and price and latency. Other embodiments use other sorting arrangements, all of which are well within the scope of the invention.

Figure 26A:
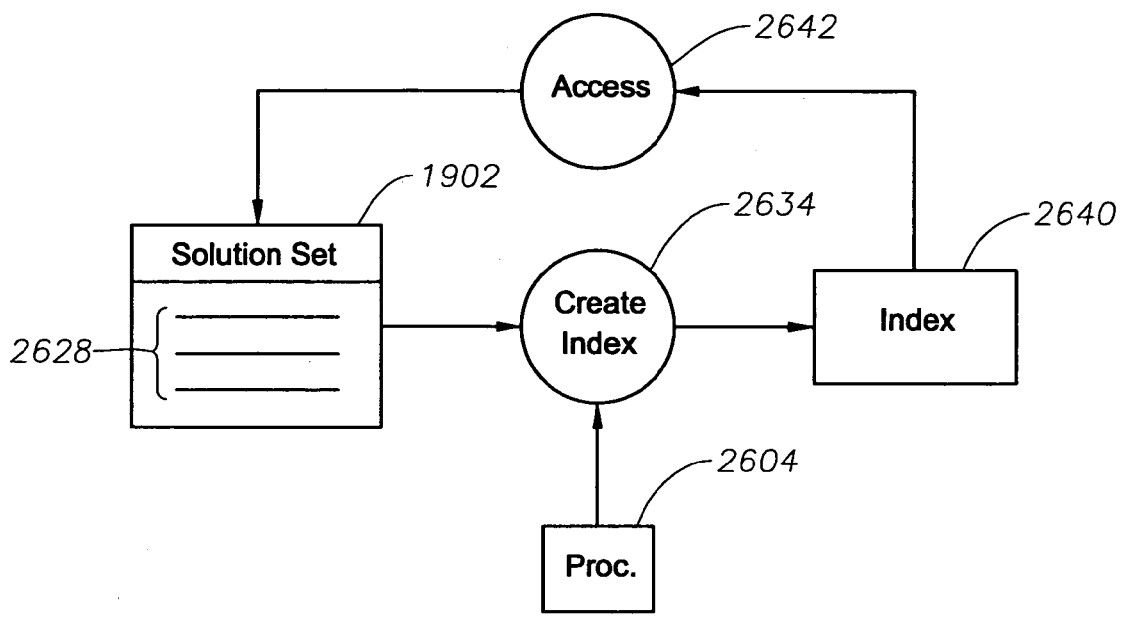
FIG. 26A illustrates creating an index for a solution set and accessing the solution set by use of the index.

In a further embodiment, shown in FIG. 26, the processor is further programmed to delete (2636) solution latency from the sorted solution records (2632). In a further embodiment, illustrated in FIG. 26A, the processor (2604) is further programmed to create (2634) an index (2634) from the solution records (2628) in the solution set (1902) for use in improved access (2642) to the solution records (2628). Indexes so created are ordered, in various alternative embodiments, according to side, price, latency, price and latency, side and price and latency, and other ordering principles. These, as well as all other arrangements of indexes for improving access to the solution records, in various alternative embodiments, are well within the scope of the invention.

In a further embodiment, illustrated in FIG. 26, the solution record (1906) further includes a type code (1926). In many embodiments, the type code (1926) is used to select among computer program subroutines to vary the function of the invention to provide solutions optimizing speed of order execution, solutions optimizing price, solution optimizing quantities of securities traded, and quantities optimizing other parameters of performance. Many such solutions are effected by use of various sorting principles applied to solution records in computer memory.

In a further embodiment, shown in FIG. 20A, latency comprises the difference between the time when a broker-dealer receives from a market a response to an order and the time when the order was sent to the market. Other embodiments measure latency according to the time for the order to travel from the broker-dealer to the market. Other embodiments measure latency according to the fill time within the market. All measures of latency as used in various embodiments are well within the scope of the invention.

An example of operation of the invention as a system for trading securities is the following. Assume that a reference table contains the following information regarding latency and hidden quantity ratios of markets.

| Reference Table | | |
|---|---|---|
| MPID | LATENCY | HQR |
| MSCO | SN | 0.50 |
| ISLD | 52 | 1.50 |
| INCA | 475 | 1.25 |
| GSCO | SN | 0.75 |
| MADF | SN | 0.75 |
| ARCA | 385 | 1 |
| SN | 3500 | NA |

In most embodiments, MPIDs in the table will represent all currently-active markets. Note that all market makers will receive any orders sent them either through SelectNet or SOES and therefore must use the execution speed of those systems.

Upon receiving the following level-two quote the system will create the following solution record. Only the bid side is illustrated. The solution record as illustrated is already sorted according to price.

| Level-Two Quote (Bid) | | |
|---|---|---|
| Bid MPID | Bid Price | Bid Quantity |
| MSCO | 99 | 1 |
| GSCO | 99 | 2 |
| ISLD | 99 | 1 |
| MADF | 98 | 10 |
| ARCA | 98 | 8 |
| INCA | 98 | 7 |

Sorting according to price and latency produces the following form of solution.

| Solution (Bid Side Only) | | |
|---|---|---|
| MPID | Price | Quantity |
| ISLD | 99 | 1 |
| MSCO | 99 | 1 |
| GSCO | 99 | 2 |
| ARCA | 98 | 8 |
| INCA | 98 | 7 |
| MADF | 98 | 10 |

Calculating a calculated quantity dependent upon bid quantity and hidden quantity ratio is illustrated in the following table:

| Bid MPID | Bid Price | Bid Quantity | HQR | Calculated Quantity | Market Adjusted Quantity |
|---|---|---|---|---|---|
| ISLD | 99 | 1 | 1.50 | 1.5 | 1.5 |
| MSCO | 99 | 1 | 0.50 | 0.5 | 1 |
| GSCO | 99 | 2 | 0.75 | 1.5 | 1.5 |

-continued

| Bid MPID | Bid Price | Bid Quantity | HQR | Calculated Quantity | Market Adjusted Quantity |
|---|---|---|---|---|---|
| ARCA | 98 | 8 | 1 | 8 | 8 |
| INCA | 98 | 7 | 1.25 | 8.75 | 8.75 |
| MADF | 98 | 10 | 0.75 | 7.5 | 7.5 |

Market Adjusted Quantity is the result of applying market rules to the calculated quantity. For example, orders through SelectNet must be for at least 100 shares, and some markets have rules for preferencing market participants who are not currently priced at the inside price. Note that in this example embodiment, calculating the calculated quantity can be done before or after sorting the solution records.

In many embodiments, determination will be made for each market whether to use the calculated quantity or the quoted quantity. Because ECN quotes are usually representations of actual orders, ECN quotes are relatively firm. However, many ECNs support forms of hidden orders. Even for ECN's, therefore, there is often opportunity to execute quantities larger than their respective quoted quantities. In this example, it is determined that the opportunity to execute against hidden orders in ISLD, ARCA and INCA is significant and the calculated quantity is used, resulting in the following solution, dependent upon the liquidity (quoted quantity) of the stock.

| Solution (Bid Side Only) | | |
|---|---|---|
| MPID | Price | Quantity |
| ISLD | 99 | 1.5 |
| GSCO | 99 | 2 |
| MSCO | 99 | 1 |
| INCA | 98 | 8.75 |
| ARCA | 98 | 8 |
| MADF | 98 | 10 |
| BBO | 99 | 1.5 |

This solution in this example is provided to at least one client. If the client is an automated system for trading securities, the example processing continues as follows. Assume that the offer side of the current pertinent level-two quote is the following:

| Level-Two Quote (for a security represented by a symbol) | |
|---|---|
| Quantity | Price |
| 1000 | 98½ |
| 5000 | 99 |

On that assumption, use of the new solution in the embodiment under discussion would cause the following orders to be generated in response to a customer order to sell 1000 shares, trading 1000 shares at 98½ as follows:

| Orders | | | | | |
|---|---|---|---|---|---|
| MPID | Side | Quantity | Price | Via | Price Improvement |
| ISLD | S | 150 | 99 | | ½ |
| GSCO | S | 200 | 99 | SOES | ½ |
| MSCO | S | 100 | 99 | SOES | ½ |
| INCA | S | 550 | 99 | | ½ |

After these trades are executed, the remaining offer side of the current level-two quote is 5000 shares at $99.00. The remaining unused records on the bid side of the solution set would be:

| Solution (Bid Side Only) (remaining unused solution records) | | |
|---|---|---|
| MPID | Price | Quantity |
| INCA | 98 | 3.75 |
| ARCA | 98 | 8 |
| MADF | 98 | 10 |

The "used" solution records are removed in this example embodiment to avoid sending new orders to markets that may no longer have sufficient quantity to fill orders. Sending orders to markets with increased risk of failure to fill is potentially costly in terms of overall execution time for customers' orders. In this example it is useful to note that the used solution record for the Island ECN (MPID=ISLD) was deleted from the set of solution records remaining after the trade. The ISLD solution record was deleted despite the fact that ISLD shows an hidden quantity ratio of 1.5, indicating that ISLD may fill orders for quantities substantially larger than ISLD's quoted quantities for a security, therefore identifying ISLD as a natural trader, in this case a natural seller, of the subject securities. Nevertheless, many such embodiments will delete the ISLD solution record after using it to develop an order because it may not be possible to know or infer whether ISLD will continue to sell securities at the previous quoted price. Continuing to order at that price might risk a time-consuming order round trip, rejection for nothing. In such embodiments, the system waits for ISLD to refresh its quote and uses the new quote price with the quote quantity and the hidden quantity ratio to generate a new solution record for ISLD. This approach addresses the problem of hidden liquidity by use of the hidden quantity ratio on a new quote, rather than by leaving the ISLD solution record in the solution set in reliance on the previous quote.

Figure 30:
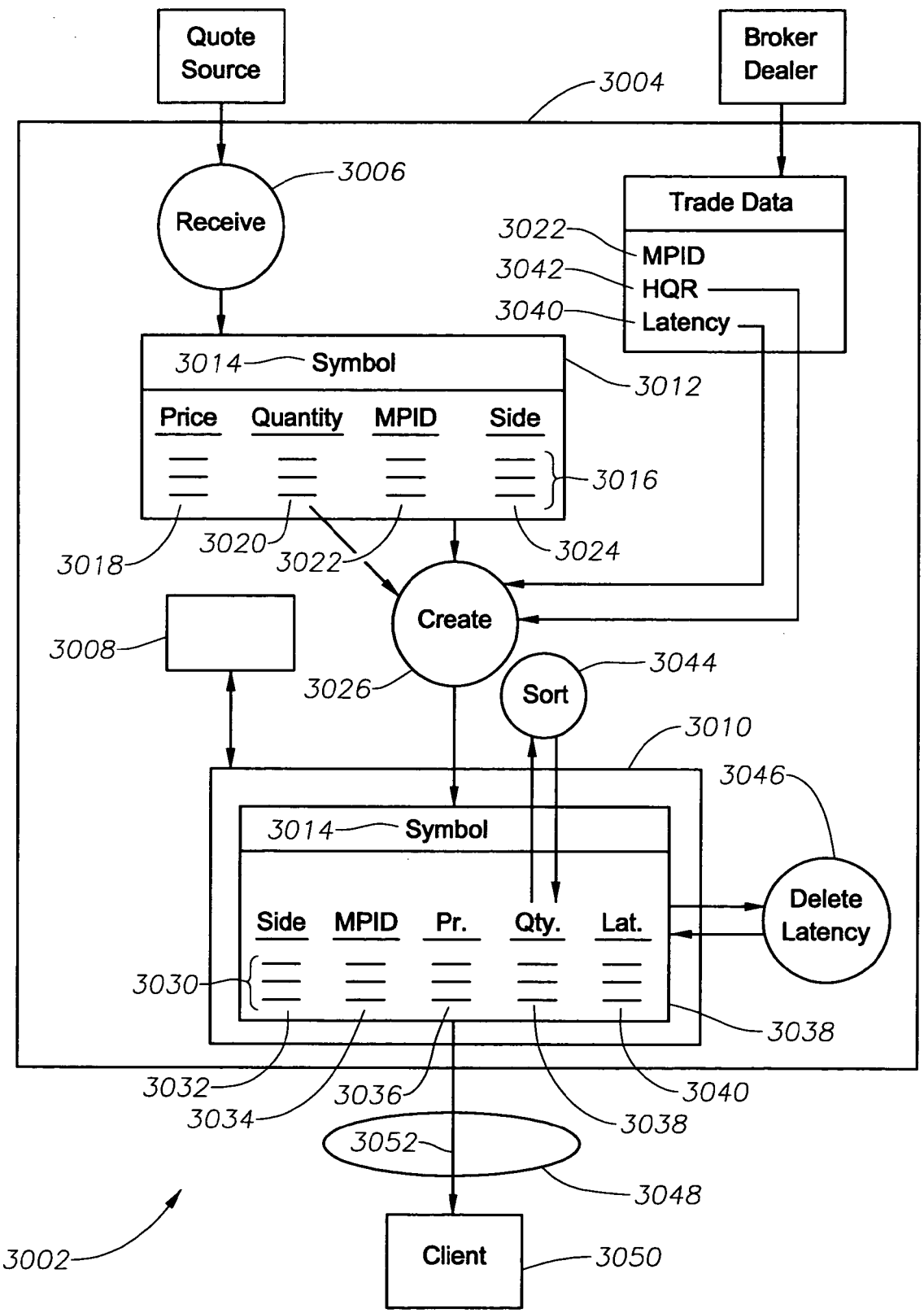
FIG. 30 illustrates creation of an improved level-two quote.

Turning now to FIG. 30, an additional aspect of the invention is seen, that is, a method (3002) of creating an improved level-two quote. One embodiment shown in FIG. 30 includes receiving (3006) in an automated system (3004), which system comprises at least one computer processor (3008) coupled to computer memory (3010), a level-two quote (3012), the level-two quote comprising a data format further comprising a symbol (3014) and at least one market participant quote (3016), the market participant quote further comprising a quote price (3018), a quote quantity (3020), a quote MPID (3022), and a quote side (3024).

The first embodiment illustrated in FIG. 30 also includes creating (3026) in computer memory (3010) an improved level-two quote (3028) comprising a symbol (3014) and at least one improved market participant quote (3030), which improved market participant quote comprises a side (3032), an MPID (3034), a price (3036), a quantity (3038) dependent upon the market participant quote quantity (3020) and also dependent upon a hidden quantity ratio (3042). An additional embodiment shown on FIG. 30 provides in the improved market participant quote a latency (3046), the latency comprising a latency for the market identified by the MPID (3034).

A further embodiment shown in FIG. 30 includes the improved level-two quote (3028) comprising at least two improved market participant quotes (3030) wherein the improved market participant quotes are sorted (3044). Some embodiments sort according to side. Other embodiments sort according to price, latency, price and latency, or side and price and latency. Still other embodiments utilize other sorting principles, all sorting arrangement being well within the scope of the invention.

The illustrated embodiments of FIG. 30 include providing (3052) the improved level-two quotes (3028) to clients (3050), including providing the improved level-two quote to clients in the form of streaming serial data provided to clients by use of suitable means for data communications (3048). Suitable means for data communications, useful in various embodiments, includes networks, dedicated satellite channels, dedicated telephone lines, and the like. Any form of data communications adapted to stream data in the form of level-two quotes is well within the scope of the invention. In addition to other data elements comprising an improved level-two quote, some embodiments make available to clients for display, or for other uses, at least one indication of hidden liquidity, such as, for example, a hidden quantity ratio. The improved level-two quotes are provided to clients for use in trading, investment decision-making, or for display at the client's option. Clients for the invention include market participants, electronic market participants, investors, traders, institutions, market makers, ECNs, websites, web pages, broadcast or cable television channels, and any other clients interested in streaming market data.

The invention claimed is:

1. A method of providing solutions for trading securities, the method comprising the steps of:
   receiving a level-two quote, the level-two quote comprising a symbol and at least one market participant quote, the market participant quote further comprising a quote price, a quote quantity, a quote market participant identification ("MPID"), and a quote side;
   creating in computer memory a solution set comprising at least one solution record corresponding to each market participant quote in the level-two quote, the solution record comprising a solution symbol, a solution side, a solution MPID, a solution price, a solution quantity, and a solution latency, the solution latency comprising a latency for the market identified by the solution MPID; and
   sending the solution set to at least one client, wherein the solution record further comprises a type code.

2. The method of claim 1 wherein the client comprises an automated system for trading securities, the method further comprising the steps of:
   storing the sent solution set in computer memory in the client system;
   using at least one of the sent solution records to create orders for securities; and
   deleting from computer memory the used solution records.

3. The method of claim 2 wherein the client comprises more than one automated system for trading securities and the automated systems for trading securities are scaled.

4. The method of claim 1 wherein creating a solution set further comprises recording in the solution record the solution side derived from the quote side, the solution MPID derived from the quote MPID, the solution price derived from the quote price, and the solution symbol derived from the symbol in the level-two quote.

5. The method of claim 1 wherein the solution set comprises at least two solution records, the method further comprising sorting the solution records to yield sorted solution records.

6. The method of claim 5 further comprising sorting the solution records according to side.

7. The method of claim 5 further comprising sorting the solution records according to price.

8. The method of claim 5 further comprising sorting the solution records according to latency.

9. The method of claim 5 further comprising sorting the solution records according to price and latency.

10. The method of claim 5 further comprising sorting the solution records according to side, price, and latency.

11. The method of claim 5 further comprising deleting solution latency from the sorted solution records.

12. The method of claim 1 further comprising creating an index for the solution set.

13. The method of claim 1 wherein latency comprises the difference between the time when a broker-dealer receives from a market a response to an order and the time when the order was sent to the market.

14. A system for providing solutions for trading securities, the system comprising:
   means for receiving a level-two quote, the level-two quote comprising a symbol and at least one market participant quote, the market participant quote further comprising a quote price, a quote quantity, a quote market participant identification ("MPID"), and a quote side;
   means for creating in computer memory a solution set comprising at least one solution record corresponding to each market participant quote in the level-two quote, the solution record comprising a solution symbol, a solution side, a solution MPID, a solution price, a solution quantity, and a solution latency, the solution latency comprising a latency for a market identified by the solution MPID; and
   means for sending the solution set to at least one client, wherein the solution record further comprises a type code.

15. The system of claim 14, wherein the client comprises an automated system for trading securities, the system further comprising:
   means for storing the sent solution set in computer memory in the client; means for creating, from at least one of the sent solution records, an order for securities, wherein creating an order from the sent solution record further comprises creating a used solution record; and
   means for deleting from computer memory the used solution record.

16. The system of claim 14 wherein the client comprises more than one automated system for trading securities and the automated systems for trading securities are scaled.

17. The system of claim 14 wherein means for creating a solution set further comprises means for recording in the solution record the solution side derived from the quote side, the solution MPID derived from the quote MPID, the solution price derived from the quote price, and the solution symbol derived from the symbol in the level-two quote.

18. The system of claim 14, wherein the solution set comprises at least two solution records, the system further comprising means for sorting the solution records to yield sorted solution records.

19. The system of claim 18 further comprising means for sorting the solution records according to side.

20. The system of claim 18 further comprising means for sorting the solution records according to price.

21. The system of claim 18 further comprising means for sorting the solution records according to latency.

22. The system of claim 18 further comprising means for sorting the solution records according to price and latency.

23. The system of claim 18 further comprising means for sorting the solution records according to side, price, and latency.

24. The system of claim 18 further comprising means for deleting solution latency from the sorted solution records.

25. The system of claim 14 further comprising means for creating an index for the solution set.

26. The system of claim 14 wherein solution latency comprises the difference between the time when a broker-dealer receives from a market a response to an order and the time when the order was sent to the market.

27. A system for providing solutions for trading securities, the system comprising:
   a processor coupled to at least one source of quotes and coupled to at least one client, the processor programmed to:
      receive at least one level-two quote, the level-two quote comprising a symbol and at least one market participant quote, the market participant quote comprising a quote price, a quote quantity, a quote market participant identification ("MPID"), and a quote side;
      create a solution set comprising at least one solution record corresponding to each market participant quote, the solution record comprising a solution symbol, a solution side, a solution MPID, a solution price, a solution quantity, and a solution latency, the solution latency comprising a latency for the market identified by the solution MPED; and
      send the solution set to a client; and a memory coupled to the processor, the processor programmed to store the solution set in the memory, wherein the solution record further comprises a type code.

28. The system of claim 27 wherein the client comprises an automated system for trading securities, the system further comprising a client processor coupled to client memory, the client processor programmed to:
   store the sent solution set in client memory;
   create, dependent upon the sent solution records, orders for securities; and
   send the orders for securities to markets.

29. The system of claim 27 wherein the client comprises more than one automated system for trading securities and the automated systems for trading securities are scaled.

30. The system of claim 27 wherein the processor is further programmed to record in the solution set the solution side derived from the quote side, the solution MPID derived from the quote MPID, the solution price derived from the quote price, and the solution symbol derived from the symbol in the level-two quote.

31. The system of claim 27, wherein the solution set comprises at least two solution records, the processor being further programmed the solution records to yield a sorted solution set.

32. The system of claim 31 wherein the processor is further programmed to sort the solution records according to side.

33. The system of claim 31 wherein the processor is further programmed to sort the solution records according to price.

34. The system of claim 31 wherein the processor is further programmed to sort the solution records according to latency.

35. The system of claim 31 wherein the processor is further programmed to sort the solution records according to price and latency.

36. The system of claim 31 wherein the processor is further programmed to sort the solution records according to side, price, and latency.

37. The system of claim 31 wherein the processor is further programmed to delete solution latency from the sorted solution records.

38. The system of claim 27 wherein the processor is further programmed to create an index for the solution set.

39. The system of claim 27 wherein latency comprises the difference between the time when a broker-dealer receives from a market a response to an order and the time when the order was sent to the market.

* * * * *